United States Patent
Dal Negro et al.

(10) Patent No.: US 10,378,954 B2
(45) Date of Patent: Aug. 13, 2019

(54) AZIMUTHALLY-MODULATED APERIODIC PHASE ARRAYS FOR ENGINEERED SPECTRAL SEPARATION

(71) Applicant: TRUSTEES OF BOSTON UNIVERSITY, Boston, MA (US)

(72) Inventors: Luca Dal Negro, Brookline, MA (US); Ren Wang, Medford, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 15/959,156

(22) Filed: Apr. 20, 2018

(65) Prior Publication Data

US 2018/0328782 A1   Nov. 15, 2018

Related U.S. Application Data

(60) Provisional application No. 62/488,121, filed on Apr. 21, 2017.

(51) Int. Cl.
   *G01J 1/04* (2006.01)
   *G02B 5/18* (2006.01)

(52) U.S. Cl.
   CPC ............ *G01J 1/0437* (2013.01); *G02B 5/188* (2013.01)

(58) Field of Classification Search
   CPC .............................. G01J 1/0437; G02B 5/188
   See application file for complete search history.

(56) References Cited

U.S. PATENT DOCUMENTS

| 9,103,975 B2 * | 8/2015 | Yu ........................... G02B 6/124 |
| 2010/0110430 A1 | 5/2010 | Ebbesen |
| 2015/0123017 A1 | 5/2015 | Yu |
| 2016/0069804 A1 | 3/2016 | Ashrafi |
| 2016/0127073 A1 | 5/2016 | Ashrafi |
| 2016/0276979 A1 * | 9/2016 | Shaver ................. H01Q 19/104 |

FOREIGN PATENT DOCUMENTS

EP           2551714 A1    1/2013
WO    WO 2012/103289 A1    8/2012

OTHER PUBLICATIONS

Arbabi, A. et al., "Dielectric Metasurfaces for Complete Control of Phase and Polarization with Subwavelength Spatial Resolution and High Transmission," Nature Nanotechnology, vol. 10, 2015, pp. 937-943 (27 pages).
Boriskina, S.V. et al., "Formation of colorimetric fingerprints on nano-patterned deterministic aperiodic surfaces," Optics Express, vol. 18, No. 14, Jul. 5, 2010, pp. 14568-14576 (9 pages).
(Continued)

*Primary Examiner* — Tony Ko
(74) *Attorney, Agent, or Firm* — Nixon Peabody LLP

(57) ABSTRACT

An electromagnetic radiation sorting device comprises an image sensor having an imaging plane; a substrate layer positioned adjacent to and spaced a distance from the imaging plane of the image sensor such that the imaging plane of the image sensor is in the Fresnel near field; and a functional layer coupled to the substrate layer, the functional layer having a structure that is configured to sort incoming electromagnetic radiation according to frequency by imparting orbital angular momentum and linear momentum on the incoming electromagnetic radiation.

30 Claims, 14 Drawing Sheets

(56) References Cited

OTHER PUBLICATIONS

Dal Negro, L. et al., "Analytical light scattering and orbital angular momentum spectra of arbitrary Vogel spirals," Optics Express, vol. 20, No. 16, Jul. 30, 2012, pp. 18209-18223 (15 pages).
Lawrence, N. et al., "Control of optical orbital angular momentum by Vogel spiral arrays of metallic nanoparticles," Optics Letters, vol. 37, No. 24, Dec. 15, 2012, pp. 5076-5078 (3 pages).
Lee, S.Y. et al., "Spatial and spectral detection of protein monolayers with deterministic aperiodic arrays of metal nanoparticles," Proc. Natl. Acad. Sci. USA, vol. 107, No. 27, Jul. 6, 2010, pp. 12086-12090 (5 pages).
International Search Report and Written Opinion in International Patent Application No. PCT/US2018/028707, dated Jul. 11, 2018 (10 pages).

\* cited by examiner

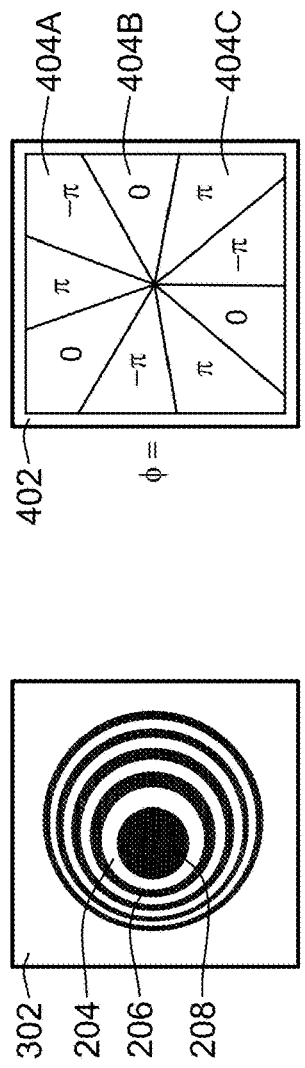
FIG. 2A
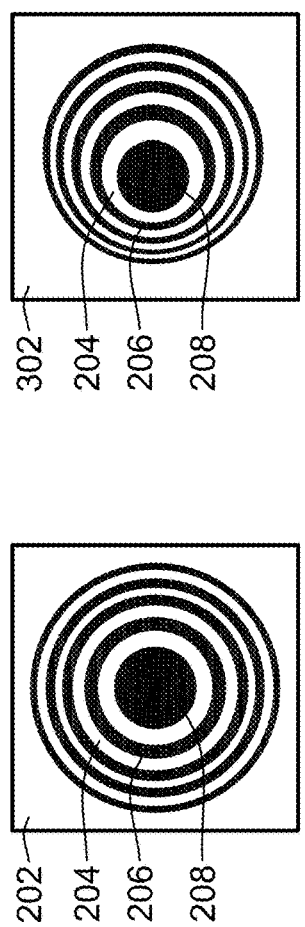
FIG. 3A
FIG. 4A
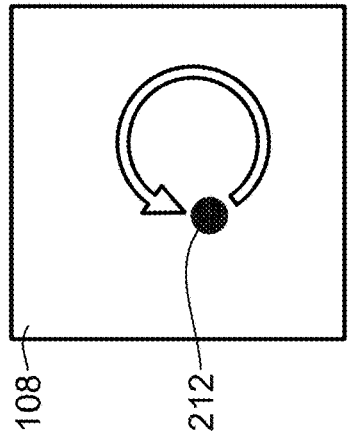
FIG. 2B
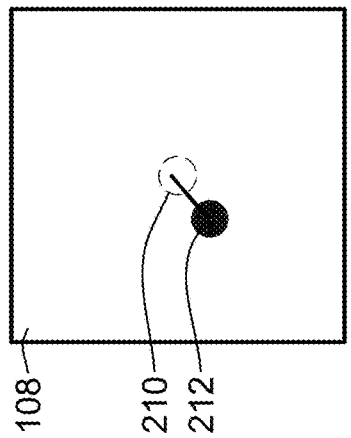
FIG. 3B
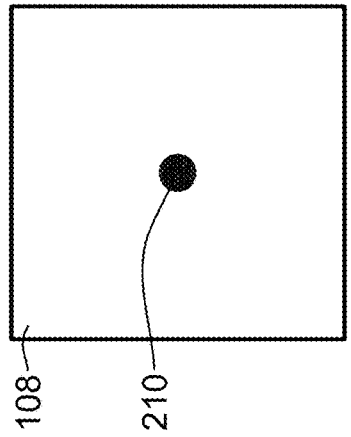
FIG. 4B

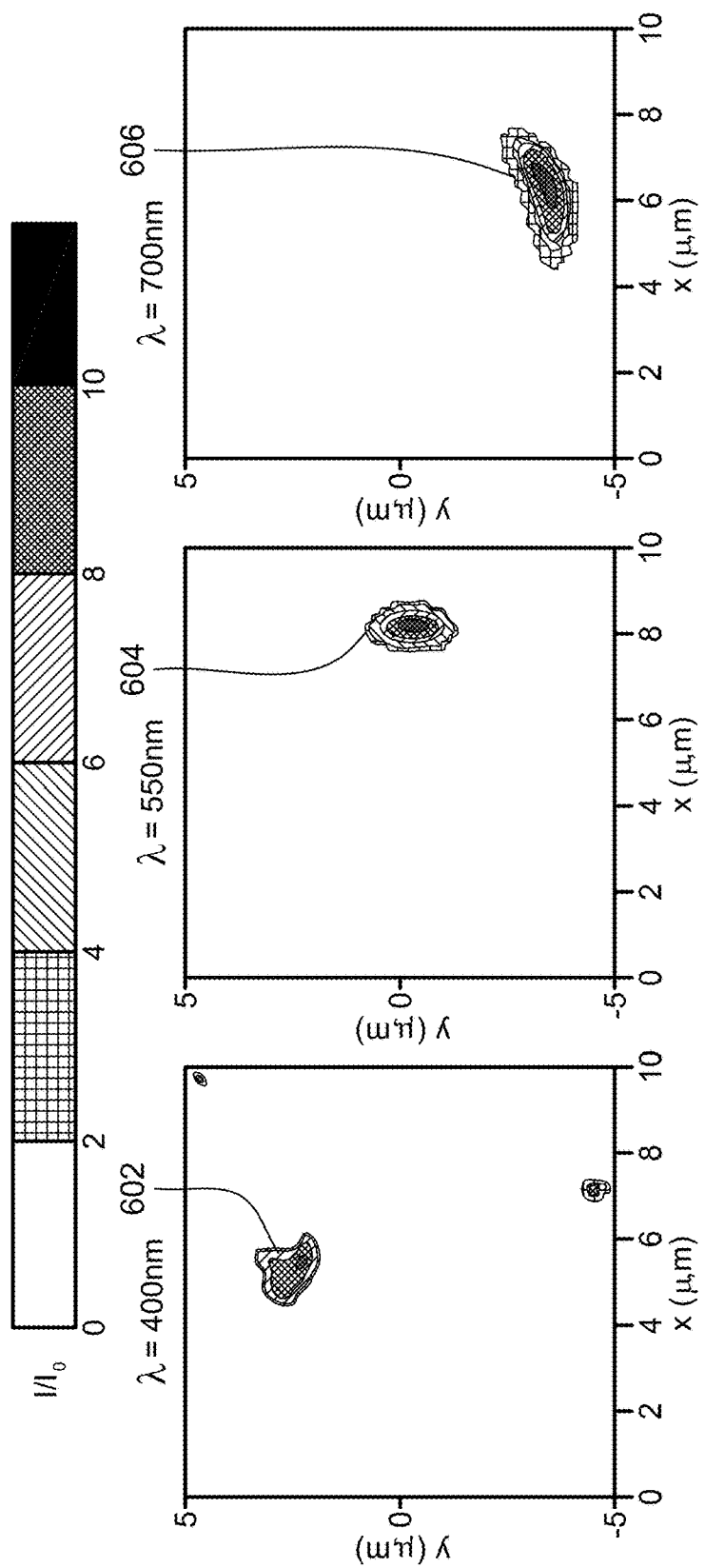

AZIMUTHALLY-MODULATED APERIODIC PHASE ARRAYS FOR ENGINEERED SPECTRAL SEPARATION

CROSS-REFERENCE TO RELATED APPLICATIONS

This application claims priority to and the benefit of U.S. Provisional Patent Application No. 62/488,121, filed Apr. 21, 2017, which is hereby incorporated by reference herein in its entirety.

STATEMENT REGARDING FEDERALLY SPONSORED RESEARCH

This invention was made with Government Support under Contract No. W911NF-12-2-0023 awarded by the Army Research Office. The Government has certain rights in the invention.

TECHNICAL FIELD

The present disclosure relates to systems and methods for sorting of electromagnetic radiation, more specifically, the present disclosure relates to a method and a system for spectral sorting of electromagnetic radiation.

BACKGROUND

Various applications require the ability to sort different spectral components of electromagnetic radiation. Current system and methods may be able to accomplish some degree of spectral sorting in the far-field region, but cannot sort spectral components of electromagnetic radiation signals in the Fresnel near field, within a few microns of a scattering object. New devices, systems, and methods are needed to overcome these problems and more.

SUMMARY

According to some implementations of the present disclosure an optical mask includes a substrate layer, an opaque layer, and a functional layer. The functional layer in conjunction with the opaque layer forms a predefined diffraction pattern that imparts orbital angular momentum and linear momentum on incoming electromagnetic radiation.

According to some implementations of the present disclosure an optical mask includes a substrate layer and a functional layer. The substrate layer has a first surface. The functional layer is coupled to the first surface of the substrate layer. The functional layer has a structure that is configured to impart orbital angular momentum and linear momentum on incoming electromagnetic radiation.

According to some implementations of the present disclosure an electromagnetic radiation sorting device includes an image sensor, a substrate layer, and a functional layer. The image sensor has an imaging plane. The substrate layer has a first surface and a second surface. The first surface of the substrate layer is positioned adjacent to and spaced a distance from the imaging plane of the image sensor. The functional layer is coupled to the second surface of the substrate layer. The functional layer has a structure that is configured to impart orbital angular momentum and linear momentum on incoming electromagnetic radiation.

According to some implementations of the present disclosure an electromagnetic radiation sorting device includes an image sensor, a substrate layer, and a functional layer. The image sensor has an imaging plane. The substrate layer is positioned adjacent to and spaced a distance from the imaging plane of the image sensor such that the imaging plane of the image sensor is in the Fresnel near field. The functional layer is coupled to the substrate layer. The functional layer has a structure that is configured to sort incoming electromagnetic radiation according to frequency by imparting orbital angular momentum and linear momentum on the incoming electromagnetic radiation.

According to some implementations of the present disclosure an electromagnetic radiation sorting device for sorting incoming electromagnetic radiation includes a substrate layer, an imaging sensor, a functional layer, and one or more processor. The substrate layer is formed of a first material. The substrate layer has a first generally planar surface and a second opposing generally planar surface. The substrate layer has an area between about 50 square microns and 200 square microns. The first material is at least partially transparent. The imaging sensor has an imaging plane that is positioned within the Fresnel near field. The imaging plane is generally parallel with the second opposing generally planar surface of the substrate. The imaging plane has an area that is about equal to the area of the substrate layer. The imaging sensor is configured to receive the incoming electromagnetic radiation on the imaging plane and to generate image data associated with the received electromagnetic radiation. The functional layer is formed of a second material. The second material is at least partially transparent. The functional layer is coupled to the first generally planar surface of the substrate layer. The functional layer has a structure that is configured to impart orbital angular momentum and linear momentum on the incoming electromagnetic radiation such that a first portion of the incoming electromagnetic radiation is caused to be incident on the imaging plane of the imaging sensor at a first set of coordinates and a second portion of the incoming electromagnetic radiation is caused to be incident on the imaging plane of the imaging sensor at a second set of coordinates. The second set of coordinates is separate and distinct from the first set of coordinates. The one or more processors is coupled to the imaging sensor and configured to (i) receive the generated image data from the imaging sensor, (ii) analyze the received image data and (iii) based at least in part on the analyzed image data, identify the first portion of the incoming electromagnetic radiation and the second portion of the incoming electromagnetic radiation.

According to some implementations of the present disclosure an optical mask includes a substrate layer, an opaque layer, and a functional layer. The substrate layer has a first surface. The opaque layer is positioned within the substrate layer such that the opaque layer is encapsulated within the substrate layer. The functional layer is coupled to the first surface of the substrate layer. The functional layer in conjunction with the opaque layer has a structure that is configured to impart orbital angular momentum and linear momentum on incoming electromagnetic radiation.

According to some implementations of the present disclosure an optical mask includes a substrate layer, an opaque layer, a spacer layer, and a functional layer. The substrate layer has a first surface. The opaque layer has a first surface and an opposing second surface. The first surface of the opaque layer is coupled to a first portion the first surface of the substrate layer. The spacer layer has a first surface and an opposing second surface. The first surface of the spacer layer is coupled to a second portion of the first surface of the substrate layer. The functional layer is coupled to the spacer layer. The functional layer in conjunction with the opaque layer has a structure that is configured to impart orbital angular momentum and linear momentum on incoming electromagnetic radiation.

According to some implementations of the present disclosure an optical mask includes a substrate layer, an opaque layer, and a functional layer. The functional layer in conjunction with the opaque layer forms a predefined diffraction pattern that imparts orbital angular momentum and linear momentum on incoming electromagnetic radiation.

According to some implementations of the present disclosure a method of manufacturing an optical mask for sorting incoming electromagnetic radiation includes providing a substrate layer of optically transparent material. An opaque layer is coupled to a first surface of the substrate layer. A portion of the opaque layer is removed, thereby forming a plurality of generally circular spatially chirped rings in the opaque layer. A spacer layer of optically transparent material is coupled to the substrate layer such that the plurality of generally circular spatially chirped rings is encapsulated between the substrate layer and the spacer layer. A functional layer of optically transparent material is coupled to the spacer layer. A portion of the functional layer is removed, thereby forming a structure that in combination with the plurality of generally circular spatially chirped rings is configured to impart orbital angular momentum and linear momentum on incoming electromagnetic radiation.

According to some implementations of the present disclosure a method of manufacturing an optical mask for sorting incoming electromagnetic radiation includes providing a substrate layer of optically transparent material. A functional layer of optically transparent material is coupled to the spacer layer. A portion of the functional layer is removed, thereby forming a structure that is configured to impart orbital angular momentum and linear momentum on incoming electromagnetic radiation.

According to some implementations of the present disclosure a method of sorting incoming electromagnetic radiation using an optical mask includes providing an optical mask including a plurality of generally circular spatially chirped opaque rings and a transparent azimuthally modulated phase gradient. Incoming electromagnetic radiation is received on a first surface of the optical mask. Using the optical mask, orbital angular momentum and linear momentum is imparted on incoming electromagnetic radiation such that a first portion of the incoming electromagnetic radiation is caused to be incident on an imaging plane of an image sensor at a first set of coordinates and a second portion of the incoming electromagnetic radiation is caused to be incident on the imaging plane of the image sensor at a second set of coordinates.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 2A is a front view of a Fresnel zone plate, according to some implementations of the present disclosure;

FIG. 2B is a front view of electromagnetic radiation being focused through the Fresnel zone plate of FIG. 2A, according to some implementations of the present disclosure;

FIG. 3A is a front view of a chirped Fresnel zone plate, according to some implementations of the present disclosure;

FIG. 3B is a front view of a representation of electromagnetic radiation being focused through the chirped Fresnel zone plate of FIG. 3A, according to some implementations of the present disclosure;

FIG. 4A is a front view of a surface having an azimuthal phase gradient, according to some implementations of the present disclosure;

FIG. 4B is a front view of a representation of electromagnetic radiation being focused through the chirped Fresnel zone plate of FIG. 3A with a surface having the azimuthal phase gradient of FIG. 4A, according to some implementations of the present disclosure;

FIG. 6A is a front view of electromagnetic radiation having a peak wavelength of 400 nanometers being focused onto the imaging plane of an image sensor at a first coordinate location by the optical mask of FIG. 5, according to some implementations of the present disclosure;

FIG. 6B is a front view of electromagnetic radiation having a peak wavelength of 550 nanometers being focused onto the imaging plane of an image sensor at a second coordinate location by the optical mask of FIG. 5, according to some implementations of the present disclosure;

FIG. 6C is a front view of electromagnetic radiation having a peak wavelength of 700 nanometers being focused onto the imaging plane of an image sensor at a third coordinate location by the optical mask of FIG. 5, according to some implementations of the present disclosure;

Figure 1:
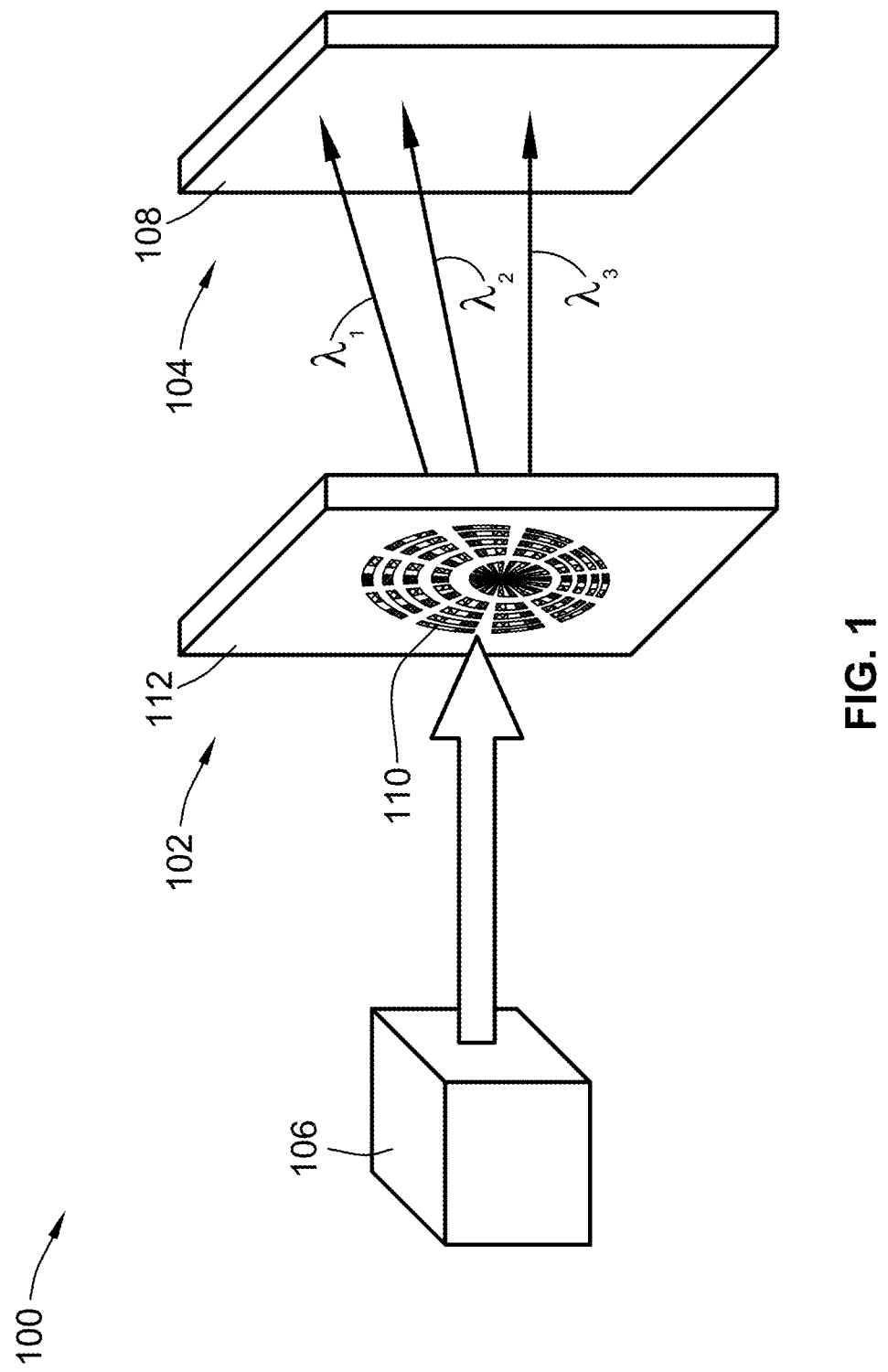
FIG. 1 is a perspective view of a system for spectral sorting of electromagnetic radiation, according to some implementations of the present disclosure.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Referring now to FIG. 1, a system 100 for sorting electromagnetic radiation includes an optical mask 102 and an image sensor 104. The system 100 also includes a source of electromagnetic radiation 106. The system 100 is configured to sort or separate different portions of incoming electromagnetic radiation by transforming any spectral differences in the different portions of incoming electromagnetic radiation produced into spatial intensity differences that can be measured with the image sensor 104. The electromagnetic radiation that is sorted by the system 100 can be produced by any suitable source of electromagnetic radiation 106. As used herein, the term "spectral differences" generally refers to individual electromagnetic waves or groups of electromagnetic waves having different wavelengths (and correspondingly, different frequencies) within the electromagnetic spectrum. For example, a first portion of electromagnetic radiation incident on the optical mask 102 may include one or more electromagnetic waves having a wavelength within a first wavelength band that is centered around a first peak wavelength (e.g. a first spectral component), while a second portion of the incident electromagnetic radiation may include one or more electromagnetic waves having a wavelength within a second wavelength band that is centered around a second peak wavelength (e.g. a second spectral component). In this example, the system 100 is able to measure these spectral components as spatial intensity variations on the image sensor 104. In this example, the image sensor 104 measures the intensity of electromagnetic radiation that propagates through the optical mask 102 and is incident on an imaging plane 108 of the image sensor 104. The optical mask 102 allows the image sensor 104 to measure a first intensity peak at a first location on the imaging plane 108, and a second intensity peak at a second location on the imaging plane 108. Each individual intensity peak corresponds to one of the portions of the electromagnetic radiation incident on the optical mask 102. The locations of the intensity peaks on the imaging plane 108 are dependent on the wavelength bands (and the corresponding peak wavelengths) of the different portions of the electromagnetic radiation. The system 100 is configured to operate in the Fresnel near field, e.g. the distance between the optical mask 102 and the image sensor 104 is selected such that the imaging plane 108 of the image sensor 104 is in the Fresnel near field. In some implementations, this distance is between about 2 microns and about 50 microns.

The wavelength of any electromagnetic wave is related to the frequency of that wave according to the equation $$\lambda = \frac{v}{f} = \frac{c}{nf},$$

where λ and f are the wavelength and frequency, respectively, of the electromagnetic wave. v is the speed of the electromagnetic wave in a given medium, c is the speed of the electromagnetic wave in a vacuum, and n is the refractive index of the medium through which the electromagnetic wave is propagating. In a vacuum, n=1, and thus v=c. The wavelength/frequency of an electromagnetic wave is also related to its class on the electromagnetic spectrum. For example, electromagnetic radiation having a wavelength of between about 400 nm and about 700 nm is considered visible light. Other classes include radio waves, microwaves, infrared radiation, and ultraviolet radiation, for example. Within the wavelength range corresponding to visible light, different wavelengths correspond to different colors of light. Thus, the system 100 is able to sort incoming electromagnetic radiation based on the wavelength/frequency/class of the incoming electromagnetic radiation. In some implementations, the system 100 can also be configured to sort electromagnetic radiation based on amplitude, velocity, polarization, or any other property of electromagnetic radiation.

As shown in FIG. 1, the optical mask 102 generally includes a functional layer 110 that is coupled to a substrate layer 112. Both the functional layer 110 and the substrate layer 112 are at least partially transparent to allow some or all of the incoming electromagnetic radiation to propagate through or around the optical mask 102 and strike the imaging plane 108 of the image sensor 104. The functional layer 110 has a structure that is configured to focus at least some of the incoming electromagnetic radiation onto the imaging plane 108, as well as impart orbital angular momentum and linear momentum to at least some of the incoming electromagnetic radiation.

To focus the incoming electromagnetic radiation onto the image sensor 104, the optical mask utilizes a structure similar to objects known as Fresnel zone plates, an example of which is shown in FIG. 2A. A Fresnel zone plate 202 focuses incoming electromagnetic radiation by utilizing principles of diffraction. The Fresnel zone plate 202 shown in FIG. 2A includes rings of opaque material 204 and rings of transparent material 206 that alternate in a radial direction. Each ring of material 204, 206 has a generally annular structure. The Fresnel zone plate 202 also includes a central area of transparent material 208. In some implementations, the rings 204, 206 and the central area 208 generally circular. Other shapes can also be utilized in other implementations. Incoming electromagnetic radiation that is incident on the zone plate 202 diffracts around the opaque rings 204 and propagates through the transparent rings 206. The alternating rings of opaque and transparent material 204, 206 are generally concentric, and are sized and spaced such that the diffracted electromagnetic radiation constructively interferes at a desired focal point. Thus, the rings of transparent material 206 (e.g. the functional layer) and the rings of opaque material 204 (e.g. an opaque layer) combine to form a predefined diffraction pattern.

In some implementations, the total surface of the opaque material is equal to the total surface area of the transparent material. The outer radius of a ring n (where the inner circle is ring 1), and thus where the zone plate switches from opaque material to transparent material or vice-versa, is given by the equation $r_n = \sqrt{2nf\lambda + (n\lambda)^2}$, where f is the distance from the center of the zone plate 202 to the focal point (e.g. the focal length), n is an integer, and $\lambda$ is the wavelength of the light that is to be focused onto the focal point. In a standard Fresnel zone plate 202, the origin $O_n$ of a ring n is 0, and all of the rings are concentric. As shown in FIG. 2B, this arrangement of generally circular alternating rings of transparent and opaque material 204, 206 is able to focus the incoming electromagnetic radiation onto a point 210 that is generally smaller than the area of the rings 204, 206. In some implementations, the functional layer 110 and the opaque layer are located at the same level of the optical mask 102, and thus are essentially a single layer that includes both opaque material and transparent material. In other implementations, the functional layer 110 and the opaque layer are separate layers that are located at different levels of the optical mask 102.

The second function of the optical mask 102 is to impart linear momentum on the incoming electromagnetic radiation. To aid in imparting linear momentum on the incoming electromagnetic radiation, the alternating rings of transparent and opaque material 204, 206 (e.g. the functional layer and the opaque layer) are spatially chirped. This spatial chirping of the rings can also aid in imparting a degree of orbital angular momentum to the incoming electromagnetic radiation. The chirping of the rings of material refers to the frequency at which the optical mask 102 transitions between transparent material and opaque material. In the chirped Fresnel zone plate 302 illustrated in FIG. 3A, the origin $O_n$ of a ring n is equal to $0.3 \times r_{n-1}$, where $r_{n-1}$ is the radius of the previous ring. As is shown in FIG. 3A, the chirping of the rings 204, 206 effectively shifts the rings 204, 206 to the left. To the left of the central area 208, the chirped Fresnel zone plate 302 alternates between the opaque material and the transparent material at a higher rate than the non-chirped Fresnel zone plate 202 in FIG. 2A, while to the right of the central area 208, the chirped Fresnel zone plate 302 alternates between the opaque material and the transparent material at a lower rate than the non-chirped Fresnel zone plate 202. This chirping effect imparts linear momentum on at least a portion of the electromagnetic radiation that is incident on the optical mask 102, and causes the electromagnetic radiation that propagates through the optical mask 102 to be focused at a point 212 that is shifted as compared to the point 210 of FIG. 2B.

Because the focal length of the Fresnel zone plate 302 depends on the wavelength of the incoming electromagnetic radiation, the amount that the incoming electromagnetic radiation is shifted due to the chirping of the rings 204, 206 is also dependent on the wavelength of the incoming representation. A representation of the shift that can be effected by imparting linear momentum on electromagnetic radiation having wavelengths in a narrow band is illustrated in FIG. 3B. In some implementations, the alternating rings 204, 206 are chirped in a single direction, e.g. along either a horizontal axis or a vertical axis of the optical mask 102. In other implementations, the alternating rings 204, 206 are chirped in two directions, e.g. along both the horizontal axis and the vertical axis. In additional implementations, the alternating rings 204, 206 are linearly chirped, e.g. the alternating rings 204, 206 are shifted in a direction that forms a straight line with the central area 208. In still other implementations, the alternating rings 204, 206 can be non-linearly chirped, e.g. the alternating rings 204, 206 are shifted in a direction that forms a curve with the central area 208.

However, merely chirping the alternating rings of transparent and opaque material 204, 206 is not sufficient to sort portions of incoming electromagnetic radiation by wavelength when the incoming electromagnetic radiation includes multiple portions having peak wavelengths within different wavelength bands. Simply focusing the incoming electromagnetic radiation with the chirped Fresnel zone plate 302 does not result in a sufficient resolution on the imaging plane 108 of the image sensor 104 to differentiate between the resulting spatial locations of different intensity peaks due to the different portions having different wavelengths.

To obtain a sufficient spatial resolution on the imaging plane 108 of the image sensor 104, the functional layer 110 of the optical mask 102 also imparts orbital angular momentum on the incoming electromagnetic radiation. To aid in imparting orbital angular momentum on the incoming electromagnetic radiation, the functional layer 110 includes transparent structures that are designed to impart a phase shift on electromagnetic radiation that propagates through the transparent material. The amount that the functional layer 110 shifts the phase of the incoming electromagnetic radiation varies azimuthally about the area of the functional layer 110. FIG. 4A illustrates an example of a surface 402 having an azimuthal phase gradient. The surface of FIG. 4A is divided into nine separate and distinct segments, where each segment is designed to shift the phase of electromagnetic radiation that propagates through the segment a certain amount $\varphi$. In the example surface of FIG. 4A, the segments are grouped into sets of three segments 404A-404C, where each set of three segments 404A-404C represents a phase shift of $2\pi$ radians. The first segment 404A in the set is designed to cause a phase shift of $-\pi$ radians. The second segment 404B in the set is designed to cause a phase shift of 0 radians. The third segment 404C in the set is designed to cause a phase shift of $+\pi$ radians. The azimuthal phase gradient illustrated in FIG. 4A is for example purposes only. A variety of different azimuthal phase gradients may be introduced by the functional layer of the optical mask 102, as further discuss herein. For example, the phase shift of the set of segments that is repeated throughout the azimuthal dimension can be less than $2\pi$ radians. The number of individual segments that impart this repeated phase shift can be more or less than three. The number of times this phase shift is repeated using the set of segments can be more or less than three.

By repeating this set of three segments in an azimuthal direction (e.g. about a circle) and implementing this structure as part of the functional layer 110, the functional layer 110 creates an azimuthal phase gradient that imparts orbital angular momentum to the incoming electromagnetic radiation. The azimuthal phase gradient can also aid in imparting linear momentum to the incoming electromagnetic radiation as well. The amount of orbital angular momentum that is imparted to any given electromagnetic wave that propagates through the optical mask 102 is dependent upon the wavelength of the electromagnetic wave. Thus, portions of the incoming electromagnetic radiation centered around different wavelengths will have different amounts of orbital angular momentum imparted thereto. This difference in imparted orbital angular momentum causes the point 212 where the focused electromagnetic radiation is incident on the imaging plane 108 of the image sensor 104 to rotate in a circular fashion about the point 210 on the imaging plane 108 where the electromagnetic radiation would be incident on the imaging plane 108 in the absence of the chirping and the absence of the azimuthal phase gradient, as illustrated in FIG. 4B. Because the amount of orbital angular momentum imparted to a given electromagnetic wave is dependent on the wavelength of that electromagnetic wave, the location on the imaging plane at which the electromagnetic wave is incident will change dependent on the wavelength.

Figure 5:
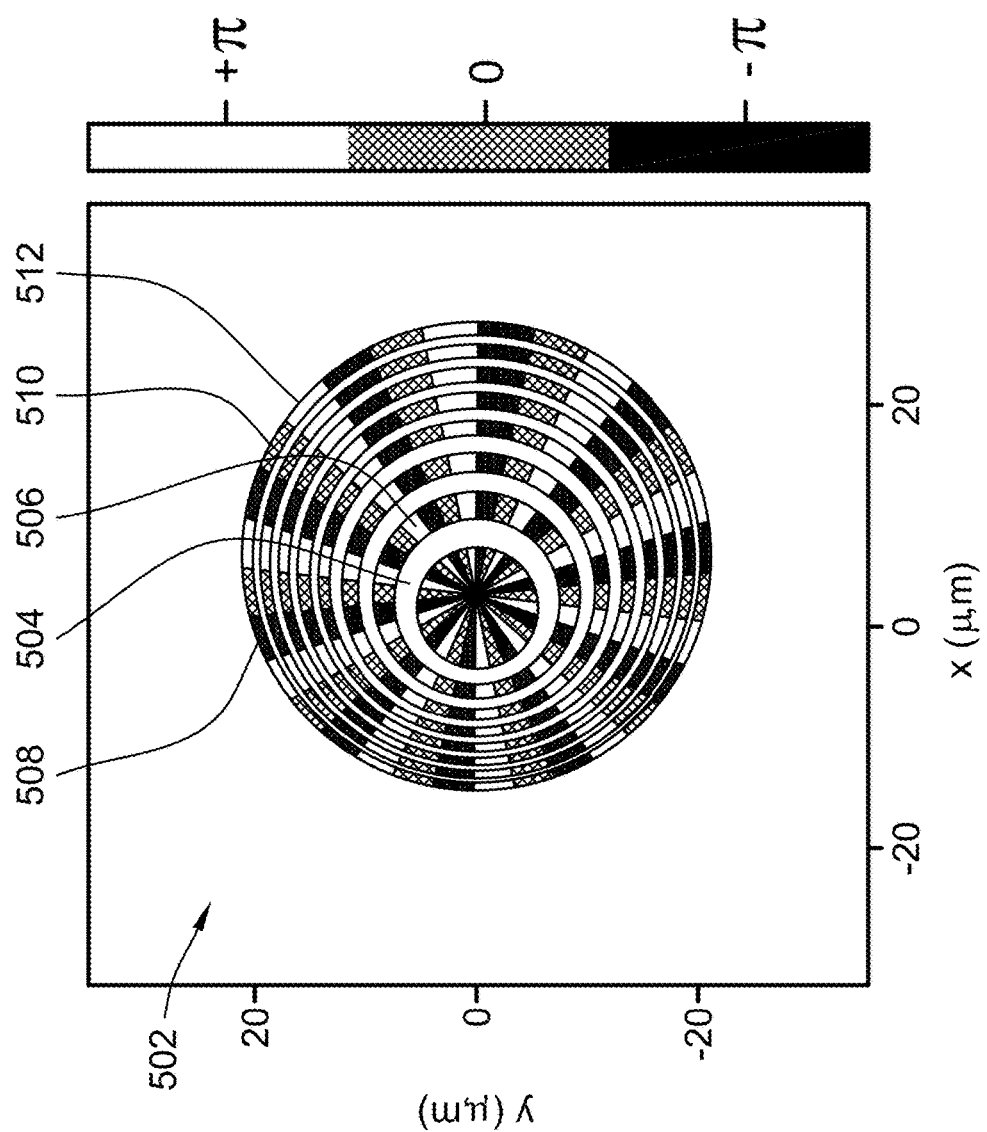
FIG. 5 is a front view of a functional layer of an optical mask, according to some implementations of the present disclosure.

The resulting functional layer 510 that is obtained by combining the chirped Fresnel zone plate FIG. 3A with the azimuthal phase gradient of FIG. 4A is illustrated in FIG. 5. The functional layer of FIG. 5 includes alternating opaque rings 504 and transparent rings 206. Generally, the surface area of the optical mask 102 outside of the largest transparent ring is also opaque. The transparent rings 506 are divided into separate and distinct segments that impart a different phase shift to the incoming electromagnetic radiation. The functional layer of the optical mask 102 can generally be divided into n×$N_{rep}$ segments, where n is the number of individual segments in each set of segments that imparts the phase shaft that is repeated through the azimuthal dimension, and $N_{rep}$ is the number of times each segment is repeated. Each set of n segments can introduce a phase shift $\varphi_{rep}$ that is repeated through the azimuthal dimension. A single segment with the set of n segments can introduce a phase shift $\varphi_n$. In the implementation illustrated in FIG. 5, n=3 and $N_{rep}$=10. As is shown, segment 508 (repeated ten times) imparts a first phase shift $\varphi_1$=−π. Segment 510 (repeated ten times) imparts a second phase shift $\varphi_2$=0. Segment 512 (repeated ten times) imparts a third phase shift $\varphi_3$=+π.

This functional layer 510 is able to focus incoming electromagnetic radiation onto the imaging plane 108 of the image sensor 104 at a location that is offset from the center of the imaging plane 108. The azimuthal location on the imaging plane 108 of the image sensor 104 of the focused electromagnetic radiation is determined by measuring the intensity of the focused electromagnetic radiation, and is indicative of the wavelength of the incoming electromagnetic radiation. For incoming electromagnetic radiation that has at least a first portion centered about a first wavelength and a second portion centered about a second wavelength, the image sensor 104 generally measures a first intensity peak at a first set of coordinates on the imaging plane corresponding to the first portion of the incoming electromagnetic radiation, and a second intensity peak at a second set of coordinates on the imaging plane corresponding to the second portion of the incoming electromagnetic radiation. The coordinate location of the first and second intensity peaks indicates the wavelength of the two portions of the incoming electromagnetic radiation, while the physical distance separating the two coordinate locations along the azimuthal direction indicates the difference between the center wavelength of the first portion and the center wavelength of the second portion. Thus, the coordinate location of the intensity peak resulting from incoming electromagnetic radiation is a function of the wavelength/frequency of the incoming electromagnetic radiation. The image sensor 104 can then generate image data that is associated with the first portion of the incoming electromagnetic radiation and the second portion of the incoming electromagnetic radiation. One or more processors can be coupled to the image sensor that are configured to (i) analyze the generated image data, and (ii) based at least in part on the analyzed image data, identify the center wavelength of the first portion of the incoming electromagnetic radiation and the center wavelength of the second portion of the incoming electromagnetic radiation.

In some implementations, the optical mask is configured to sort incoming electromagnetic radiation that is in the visible range or in the near-infrared range. Electromagnet radiation in the visible range generally has a wavelength between about 400 nanometers (corresponding to violet light and a frequency of about 750 terahertz) and about 700 nanometers (corresponding to red light and a frequency of about 420 terahertz). Electromagnetic radiation in the near-infrared range generally has a wavelength between about 700 nanometers and about 1000 nanometers. In these implementations, the number n of azimuthal segments that form the set of segments is between about three segments and about twenty segments. In some implementations, the total phase shift $\varphi_{rep}$ that is imparted by each set of n segments (that is then repeated throughout the azimuthal direction) is 2π radians. This repeated phase shift $\varphi_{rep}$ imparted by each set of n segments could also be about four radian radians when the optical mask 102 is configured to sort incoming electromagnetic radiation in the visible range. The number of times $N_{rep}$ that the set of n segments is repeated can be between about three and about twenty. Thus, the overall number of separate and distinct azimuthal phase shift segments n×$N_{rep}$ for an optical mask configured to sort incoming electromagnetic radiation in the visible range can be between about nine segments and about four hundred segments. In some implementations operating in the visible range, the total number of rings of transparent material and opaque material (transparent rings plus opaque rings) can be between about three and about twenty. In other implementations operating in the visible range, the number of rings of transparent material can be between about three and about twenty, and the number of rings of opaque material can be between about three and about twenty.

In some implementations (operating within the visible range and the near-infrared range, or outside of the visible range and the near-infrared range), the set of n segments that spans the repeated phase shift is repeated just once, e.g. $N_{rep}$=1. In other implementations, the set of n segments is repeated three times, as discussed above and illustrated in FIG. 4A. In additional implementations, the set of n segments is repeated at least five times. In still other implementations, the set of n segments is repeated between about three times and between about twenty times. In some implementations, total surface area of the optical mask 102 can be between about fifty square microns (micrometers)

and about two hundred square microns. In other implementations, the optical mask has a square surface area of about ten microns by about ten microns, or about twenty microns by about twenty microns. The thickness of the functional layer of the optical mask can be about one micron or less in some implementations. The thickness of the entire optical mask can be less than about ten microns, less than about five microns, less than about two microns, or less than about one microns. Other thicknesses are also suitable. $\varphi_{rep}$ can be about $2\pi$ radians, or can be about 4 radians. Other values of $\varphi_{rep}$ may also be suitable.

In some implementations operating within the visible range or outside of the visible range where n=3 and $\varphi_{rep}=2\pi$ radians, the phase shift $\varphi_2$ imparted by the second segment in the set can be a non-zero amount between $-\pi$ radians and $+\pi$ radians. In still other implementations, the first segment in the set can impart a phase shift of $\varphi_1=0$ radians, the second segment in the set can impart a phase shift of $\varphi_2=+\pi$ radians, and the third segment in the set can impart a phase shift of $+2\pi$ radians. In some implementations operating within the visible range or outside of the visible range where n=3 and $\varphi_{rep}=4$ radians, the phase shift $\varphi_2$ imparted by the second segment in the set can be a non-zero amount between $-2$ radians and $+2$ radians. In still other implementations, the first segment in the set can impart a phase shift of $\varphi_1=0$ radians, the second segment in the set can impart a phase shift of $\varphi_2=2$ radians, and the third segment in the set can impart a phase shift of 4 radians.

Importantly, imparting orbital angular momentum via azimuthal phase gradients by itself does not give rise to any noticeable rotation of the electromagnetic radiation incident on the imaging plane of an image sensor, and thus generally does not allow for any meaningful spectral sorting of incoming electromagnetic radiation. However, the combination of the azimuthal phase gradient and the chirped Fresnel zone plate unexpectedly results in a wavelength-dependent rotation of the incident electromagnetic radiation on the imaging plane of the image sensor that can be quantified and used to sort spectral components of the incoming electromagnetic radiation.

FIGS. 6A-6C illustrate intensity measurements using one implementation of the optical mask 102 described above. As shown, the system was used to measure the intensity resulting from incoming electromagnetic radiation within the visible range. In FIG. 6A, electromagnetic radiation having a peak wavelength of about 400 nanometers propagated through the optical mask and was incident on the imaging plane 108 of the image sensor. In FIG. 6B, the incoming electromagnetic radiation had a peak wavelength of about 550 nanometers. In FIG. 6C, the incoming electromagnetic radiation had a peak wavelength of about 700 nanometers. The intensity of the incident electromagnetic radiation was measured, and the spatial location of the resulting intensity peaks are shown in the graphs of FIGS. 6A-6C.

In the graph of FIG. 6A, the combination of the focusing, imparted linear momentum, and imparted orbital angular momentum from the optical mask 102 causes the electromagnetic radiation having a peak wavelength of about 400 nanometers to be incident at a first coordinate location 602 in the upper-middle of the imaging plane 108 of the image sensor. As shown in the graph of FIG. 6B, the optical mask 102 causes the electromagnetic radiation having a peak wavelength of about 550 nanometers to be incident at a second coordinate location 604 that is shifted along a circular arc downward and to the right of the first coordinate location. As shown in the graph of FIG. 6C, the optical mask 102 causes the electromagnetic radiation having a peak wavelength of about 700 nanometers to be incident at a third coordinate location 606 that is shifted along a circular arc downward and to the left from the second coordinate location. The optical mask thus causes incoming electromagnetic radiation having a different wavelength to rotate about a generally circular path on the imaging plane 108 of the image sensor. The spatial differences between the measured intensity peaks along this generally circular path are identifiable and can thus be used to identify the peak wavelength of electromagnetic radiation having an unknown wavelength.

Figure 6D:
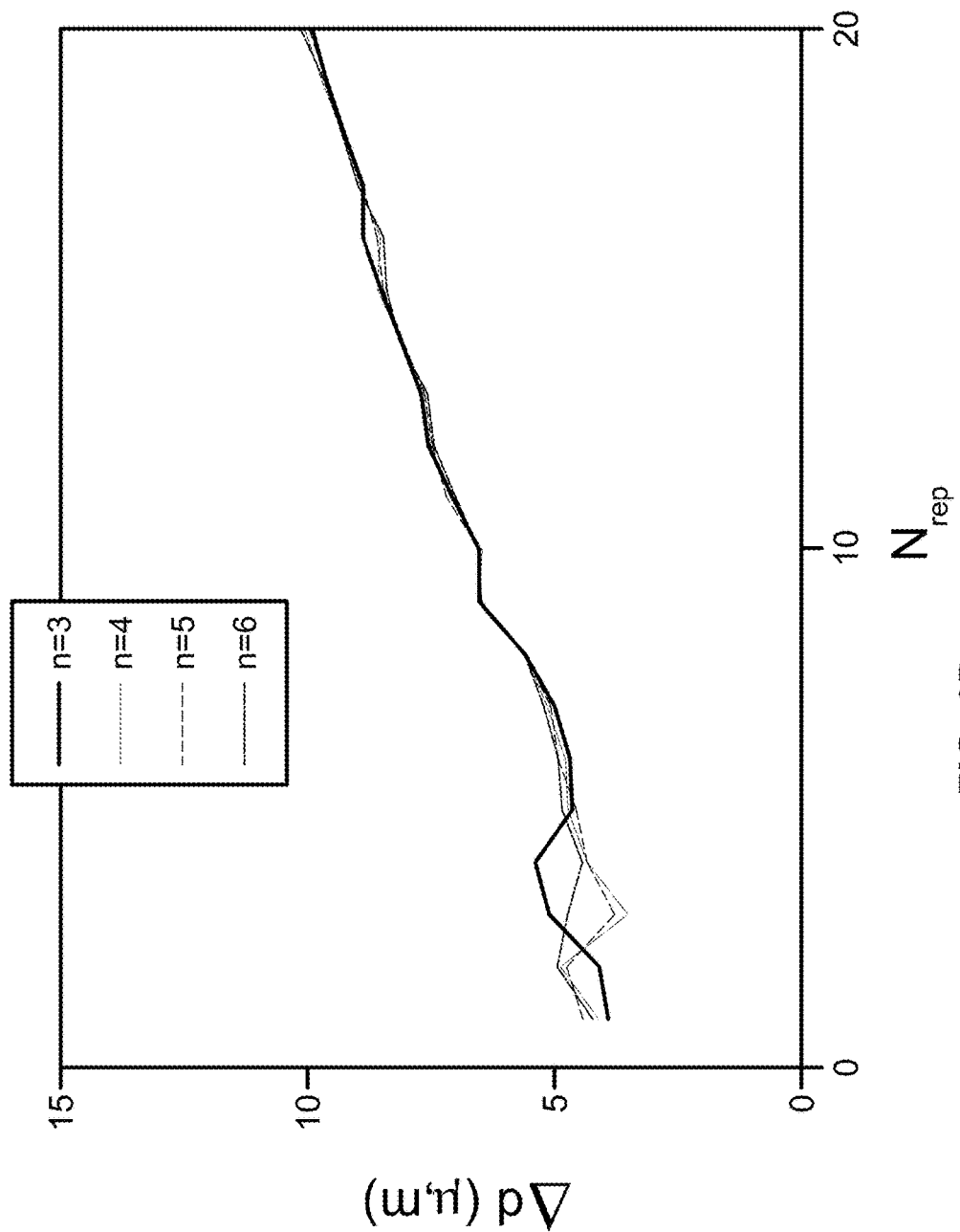
FIG. 6D is a graph showing the displacement between a first coordinate location on the imaging plane and the second coordinate location on an imaging plane due to incoming electromagnetic radiation having a peak wavelength difference of 300 nanometers for various configurations of an active layer of an optical mask, according to some aspects of the present disclosure.

The graph in FIG. 6D illustrates the circular distance $\Delta d$ along this generally circular path between two intensity peaks resulting from two instances of incident electromagnetic radiation having a peak wavelength difference $\Delta\lambda$, of about 300 nanometers. This distance $\Delta d$ is plotted against $N_{rep}$, the number of times each set of n segments is repeated along the full azimuthal dimension of an optical mask. The value of $\Delta d$ as a function of $N_{rep}$ is plotted four times, each plot corresponding to an optical mask 102 having a different number n of azimuthal segments. For example, the optical mask 502 illustrated in FIG. 5 has an $N_{rep}$ value of ten and an n value of three.

As shown in the graph of FIG. 6D, increasing the $N_{rep}$ value of an optical mask generally increases the circular distance $\Delta d$ between intensity peaks of electromagnetic radiation having a peak wavelength difference of about 300 nanometers. Thus, by repeating the set of azimuthal segments that span the repeated phase shift $\varphi_{rep}$ more often, the resolution afforded by the system 100 increases. Moreover, the number of segments n that are used to impart the repeated phase shift $\varphi_{rep}$ has less effect on the resolution of the system for $N_{rep}$ values greater than about eight. However, higher $N_{rep}$ and n values increase the complexity of the functional layer, and can thus result in an optical mask that is more difficult and/or costlier to manufacture.

Figure 7A:
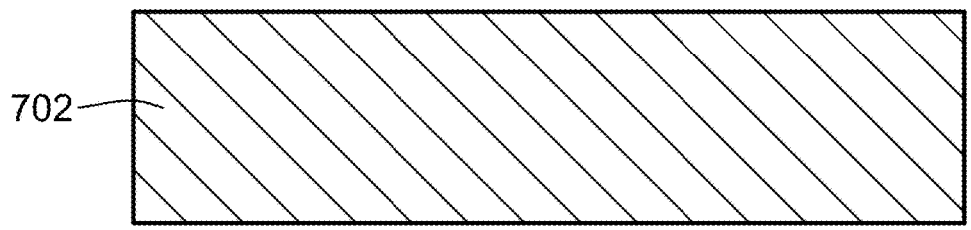
FIG. 7A is a cross-sectional view of a first step in a method of manufacturing an optical mask, according to some implementations of the present disclosure.
Figure 7B:
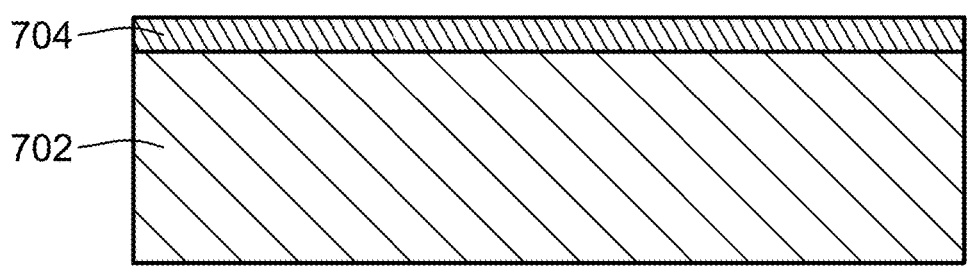
FIG. 7B is a cross-sectional view of a second step in a method of manufacturing an optical mask, according to some implementations of the present disclosure.

An implementation of a method of manufacturing an optical mask, such as the optical mask 502 of FIG. 5, is illustrated in the cross-sectional views of FIGS. 7A-7F. In FIG. 7A, a substrate layer 702 is provided. The substrate layer 702 is generally comprised of an optically transparent material having a low refractive index (e.g. a refractive index near 1) so as to allow incoming electromagnetic radiation to propagate through the substrate. layer. The transparent material of the substrate layer 702 can include, for example, silicon dioxide ($SiO_2$), fused silica, or quartz. In some implementations, the thickness of the substrate layer 702 can be between about 600 microns and about 620 microns. In FIG. 7B, a first surface of an opaque layer 704 is deposited or otherwise coupled to a first surface of the substrate layer 702. When deposited, the opaque layer 704 can cover a large portion of the area of the first surface of the substrate layer 702. The opaque layer 704 is generally comprised of an opaque metallic material, such as aluminum or gold. The opaque layer 704 can also comprise light-absorbing semiconductor materials such as silicon or germanium. For incoming electromagnetic radiation in the infrared wavelength range or longer, metallic opaque layers are generally preferred. The incoming electromagnetic radiation thus generally cannot propagate through the opaque layer 704. In other implementations, the opaque layer 704 is not comprised of fully opaque material, but rather is comprised of material that has a degree of translucency, or even transparent material, that imparts a phase shift of $\pi$ radians. In some implementations, the opaque layer 704 can have a thickness of between about thirty nanometers and about fifty nanometers.

Figure 7C:
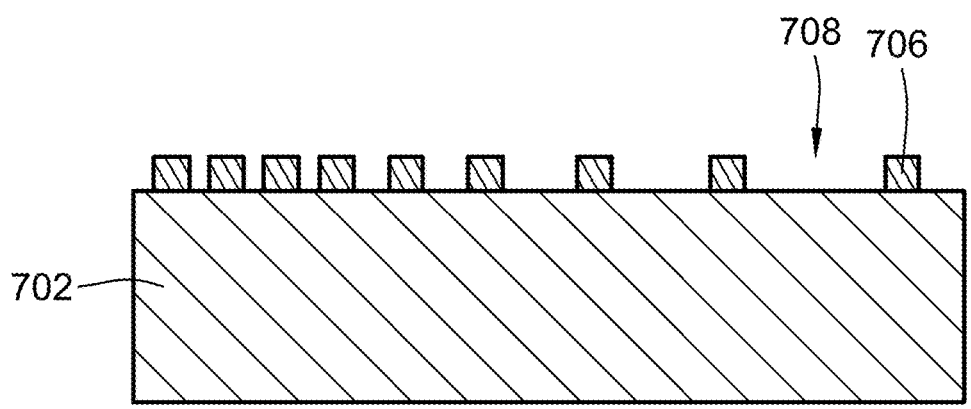
FIG. 7C is a cross-sectional view of a third step in a method of manufacturing an optical mask, according to some implementations of the present disclosure.

In FIG. 7C, a first portion of the opaque layer 704 is etched away such that the remaining second portion 706 of the opaque layer 704 forms a first plurality of generally circular spatially chirped rings, e.g. the opaque rings of the optical mask 102. The second remaining portion 706 of the opaque layer 704 thus remain coupled to a first portion of the substrate layer 702, while a second portion of the first surface of the substrate layer 702 remains exposed through gaps 708 defined in the opaque layer 704. The removed portions/gaps 708 of the opaque layer 704 can be removed by any suitable manufacturing process, such as wet etching, plasma etching, photochemical etching, reactive ion etching, or any other suitable process. As shown in the cross-sectional view of FIG. 7C, the remaining portions 706 of the opaque layer 704 after the etching step is spatially chirped, e.g. the distance between adjacent rings of opaque material decreases towards the left, and increases towards the right.

Figure 7D:
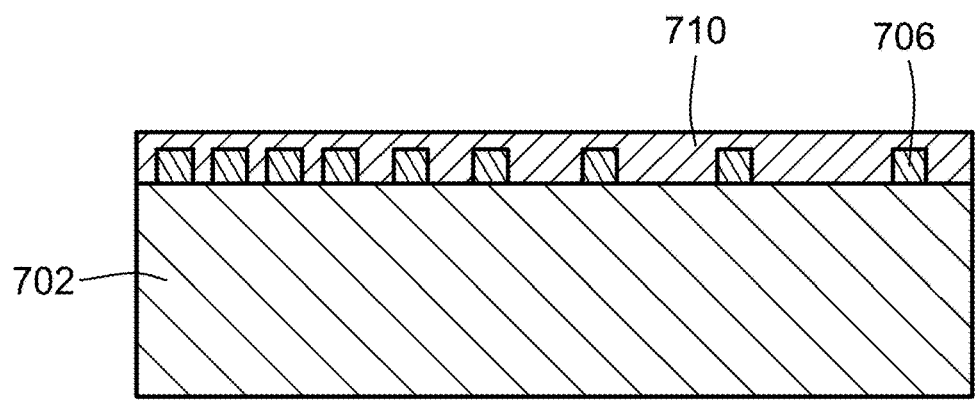
FIG. 7D is a cross-sectional view of a fourth step in a method of manufacturing an optical mask, according to some implementations of the present disclosure.

In FIG. 7D, a first surface of a spacer layer 710 is deposited onto or otherwise coupled to the second portion of the first surface of the substrate layer 702, and a first surface of the remaining opaque layer 704. The spacer layer 710 thus forms a second plurality of generally circular spatially chirped rings that fill in the gaps 708 in the opaque layer 704 remaining after the etching process. The second plurality of generally circular spatially chirped rings alternate in a radial direction. The spacer layer 710 is also coupled to the second opposing surface of the opaque layer 704. The height of the spacer layer 710 as illustrated in FIG. 7D is greater than the height of the remaining portions 706 of the opaque layer 704. In some implementations, the spacer layer 710 is not deposited on top of the remaining portions 706 of the opaque layer 704, but instead only fills in the gaps 708 between these remaining portions 706 of the opaque layer 704. In these implementations, the spacer layer 710 is only coupled to the second portion of the first surface of the substrate layer 702, and not the first surface of the opaque layer 704. The height of the spacer layer 710 in these implementations is equal to the height of the remaining portions 706 of the opaque layer 704.

In either implementation, the top layer of the optical mask after this step (comprising either only the spacer layer 710 or both the spacer layer 710 and the opaque layer 704) is generally planar. The thickness of the spacer layer 710 can vary, but generally must be sub-wavelength, e.g. must be smaller than the wavelength of the incoming electromagnetic radiation that the given optical mask will be used with. The thickness of the spacer layer 710 must also be at least equal to the thickness of the opaque layer 704. Thus, the thickness of the spacer layer 710 can be between about thirty nanometers and about three hundred nanometers. The spacer layer 710 can generally comprise a transparent material similar to the transparent material of the substrate layer.

Figure 7E:
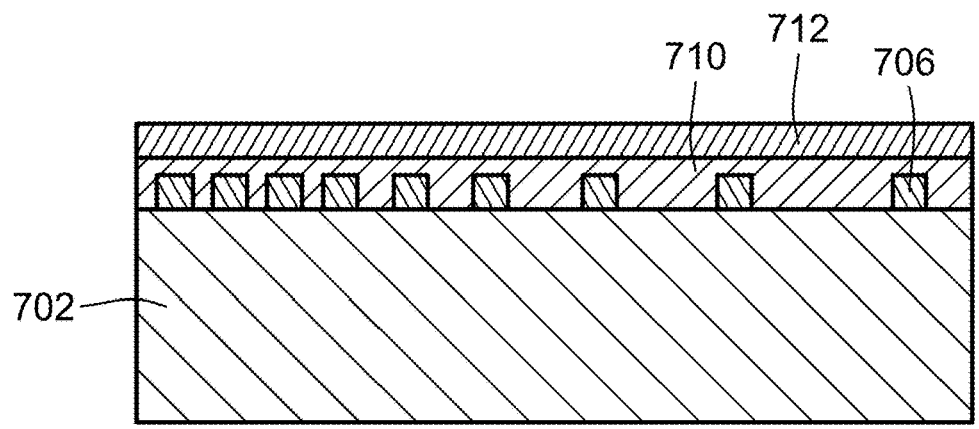
FIG. 7E is a cross-sectional view of a fifth step in a method of manufacturing an optical mask, according to some implementations of the present disclosure.

As shown in FIG. 7E, the next step in the manufacturing process is to deposit or otherwise couple the functional layer 712 onto an opposing second surface of the spacer layer 710. The functional layer 712 generally comprises a transparent material that can include, for example, silicon nitride (SiN), Titanium dioxide (TiO2), silica (SiO2), silicon (Si), Germanium (Ge), gold (Au), silver (Ag), aluminum Al), copper (Cu), platinum (Pt), indium tin oxide (ITO), aluminum doped zinc oxide (AZO), nitrogen doped tin oxide (TiN), or any combination thereof. Incoming electromagnetic radiation can thus propagate through the functional layer 712. In some implementations, the thickness of the functional layer 712 can be between about 50 nanometers and about 1000 nanometers (one micron).

Figure 7F:
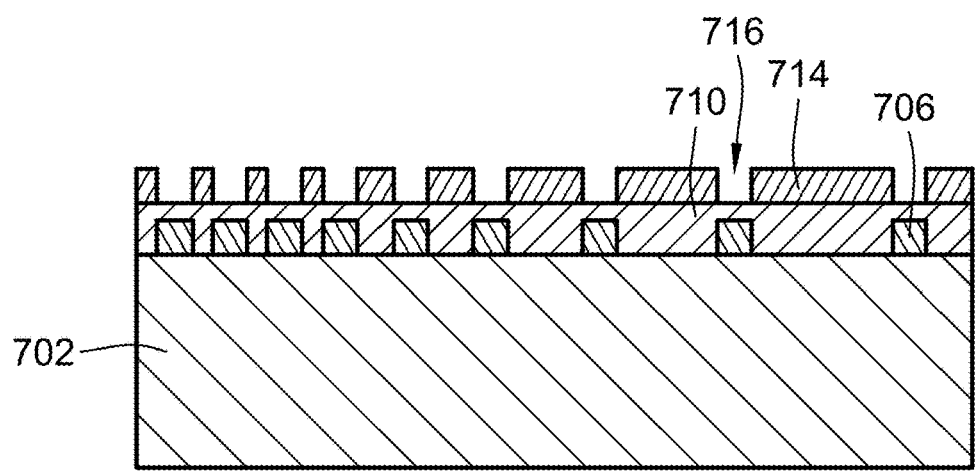
FIG. 7F is a cross-sectional view of a sixth step in a method of manufacturing an optical mask, according to some implementations of the present disclosure.

The next step in the manufacturing process is shown in FIG. 7F. Here, portions 716 of the functional layer 712 have been etched away such that the remaining portions 714 from a third plurality of generally circular spatially chirped rings, e.g. the transparent rings of the optical mask 102. Each of the third plurality of generally circular spatially chirped rings generally overlaps with and is coupled to a corresponding one the generally circular spatially chirped rings formed by the spacer layer 710 (e.g. the second plurality of generally circular spatially chirped rings). The removed portions 716 of the functional layer 712 can be removed by any suitable manufacturing process, such as wet etching, plasma etching, photochemical etching, reactive ion etching, or any other suitable process. The remaining material 714 of the functional layer 712 after the etching step is spatially chirped, e.g. the distance between adjacent rings of opaque material decreases towards the left, and increases towards the right. The portions 714 of the functional layer 712 that remain after the etching is complete generally overlap with the gaps 708 left between the remaining portions 706 of the opaque layer 704 after the opaque layer 704 is etched. As can be seen in FIG. 7F, the remaining portions 714 of the functional layer 712 are coupled to the portions of the spacer layer 710 that are disposed between the remaining portions 706 of the opaque layer 704. In some implementations, the functional layer 712 is etched further to define the required structure. The remaining portions 714 of the functional layer 712, the spacer layer 710, and the substrate layer 702 combine to form an optical path through the optical mask. The resulting structure has a functional layer and an opaque layer that in conjunction form a predefined diffraction pattern that aids in imparting linear momentum and orbital angular momentum to the incoming electromagnetic radiation. The final structure is a compact, generally planar optical mask that can be utilized in integrated devices for a wide variety of applications. For example, the optical mask can be packaged with the image sensor into a single integrated device. The optical mask and the image sensor can also be packaged with an adaptor or coupling so as to easy allow the integrated device to function with a wide variety of sources of electromagnetic radiation.

In some implementations, portions of the substrate layer 702 can be etched away so as to define a plurality of gaps in the substrate layer. In these implementations, either the opaque layer 704 or the functional layer 712 can be disposed within the gaps defined in the substrate layer 702 such that either the opaque layer 704 or the functional layer 712 are encompassed by the substrate layer 702. In other implementations, the functional layer 712 is deposited after the opaque layer 704 has been etched. The functional layer 712 can be deposited only in the gaps 708 defined in the opaque layer 704 after etching, or can be deposited in these gaps 708 and on top of the remaining portions 706 of the opaque layer 704 and then later etched away. In these implementations, the material of the functional layer 712 and the material of the opaque layer 704 are disposed within the same layer of the optical mask. Thus, in these implementations, each of the generally circular spatially chirped rings of the functional layer 712 can be positioned between an adjacent pair of the generally circular spatially chirped rings of the opaque layer 704 such that the rings alternate in the radial direction.

Figure 8B:
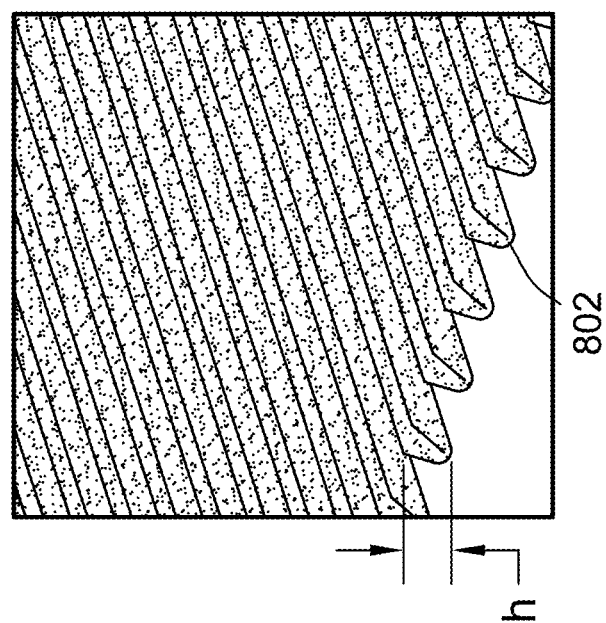
FIG. 8B is a perspective view of the plurality of nanowires of FIG. 8A, according to some aspects of the present disclosure.
Figure 8A:
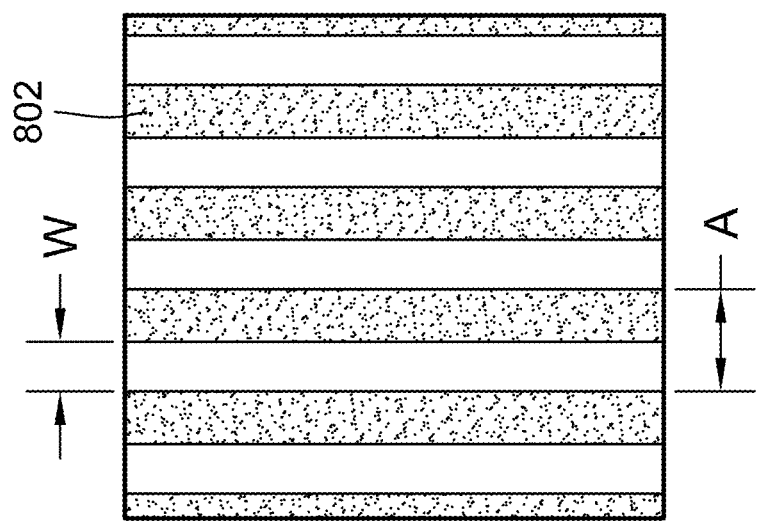
FIG. 8A is a zoomed-in view of a plurality of nanowires for imparting a phase shift, according to some aspects of the present disclosure.

In some implementations, the structure of the functional layer comprises a plurality of generally parallel nanowires 802, as illustrate in FIG. 8A and FIG. 8B. The nanowires 802 are generally comprised of the transparent material that forms the functional layer, such as, for example, silicon nitride (SiN), Titanium dioxide (TiO2), silica (SiO2), silicon (Si), Germanium (Ge), gold (Au), silver (Ag), aluminum Al), copper (Cu), platinum (Pt), indium tin oxide (ITO), aluminum doped zinc oxide (AZO), nitrogen doped tin oxide (TiN), or any combination thereof. The nanowires 802 cause the electromagnetic radiation that propagate through the nanowires 802 to be phase shifted. The phase shift is imparted through parallel and perpendicular vector components of the electromagnetic radiation. The angle of the nanowires 802 relative to a reference axis at least partially determines how much of a phase shift that the propagating electromagnetic radiation experiences. In some implementations, this reference axis is the polarization axis of the incoming electromagnetic radiation.

Generally, various dimensions of the nanowires 802 determine what wavelength range the optical mask will be configured to operate with. For electromagnetic radiation having a wavelength between about 400 nanometers and about 700 nanometers (e.g. electromagnetic radiation in the visible range) or between about 700 nanometers and about 10000 nanometers (e.g. electromagnetic radiation in the near-infrared range), a width w of each of the individual nanowires 802 can be between about 20 nanometers and about 200 nanometers, between about 50 nanometers and about 150 nanometers, or about 100 nanometers. The distance A between corresponding edges of adjacent nanowires 802 can be between about 50 nanometers and about 600 nanometers, between about 100 nanometers and about 500 nanometers, between about 200 nanometers and about 400 nanometers, or about 250 nanometers. The height h of each nanowire 802 can be between about 50 nanometers and about 1000 nanometers, between about 200 nanometers and about 800 nanometers, between about 400 nanometers and about 600 nanometers, about 500 nanometers, or about 100 nanometers.

For electromagnetic radiation having other wavelength (e.g. outside of the visible range), these dimensions of the nanowires 802 can be scaled linearly. Approximate ranges for x-ray radiation, ultraviolet radiation, and infrared radiation dimensions are shown in Table 1 below:

| | Wavelength Range | | |
|---|---|---|---|
| | w | A | h |
| X-Ray .01 nm-1 nm | .002 nm-.2 nm | .005 nm-.5 nm | .01 nm-1 nm |
| Ultraviolet 10 nm-400 nm | .2 nm-20 nm | .5 nm-50 nm | 9.5 nm-50 nm |
| Infrared 700 nm-1 mm | 200 nm-200 μm | 600 nm-50 μm | 1 μm-950 μm |

Figure 9A:
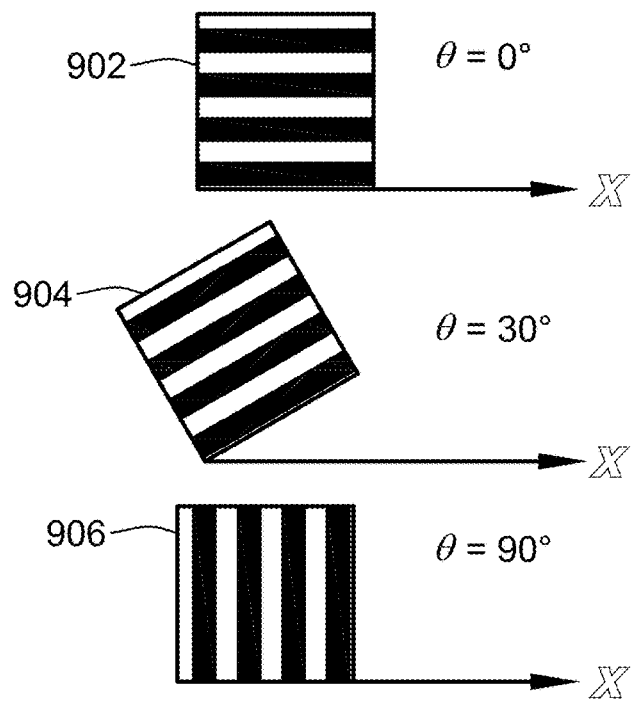
FIG. 9A is a representation of various angles at which the nanowires of FIG. 8A may be oriented at, according to some aspects of the present disclosure.
Figure 9B:
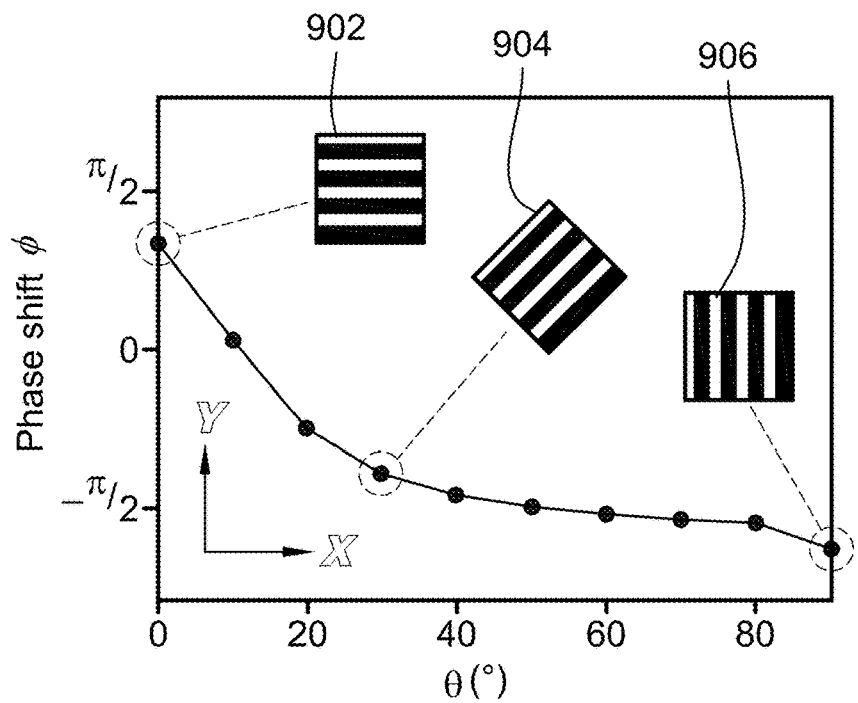
FIG. 9B is a graph showing the relationship between the angle at which the nanowires of FIG. 8A are oriented at and the phase shift caused by the nanowire, according to some aspects of the present disclosure.

FIG. 9A and FIG. 9B illustrate the relationship between the angle θ of the nanowires 802 and the reference axis in one implementation. In this implementation, the number of segments n in each set is three, the total phase shift $\varphi_{rep}$ imparted by each set of three segments is about π radians, the phase shift $\varphi_1$ imparted by a first segment 902 in the set is about $$\frac{\pi}{2}$$

radians, and the phase shift $\varphi_3$ imparted by a third segment 906 in the set is $$-\frac{\pi}{2}$$

radians. As shown, when the nanowires 802 of the first segment 902 are disposed at an angle θ=0°, the phase shift $\varphi_1$ imparted by those nanowires 802 is about $$\frac{\pi}{2}$$

radians. When the nanowires 802 of the third segment 906 are disposed at an angle θ=90°, the phase shift $\varphi_3$ imparted by those nanowires 802 is about $$-\frac{\pi}{2}$$

radians. In this implementation, the nanowires 802 of the second segment 904 are disposed at an angle θ=30°, which imparts a phase shift $\varphi_2$ of between about $$-\frac{\pi}{2}$$

radians and about 0 radians. However, in other implementations, the nanowires 802 of the second segment 904 can be disposed at any angle θ that imparts a phase shift $\varphi_2$ that is between about $$\frac{\pi}{2}$$

radians and about $$-\frac{\pi}{2}$$

radians. In other implementations, various angles θ of the nanowires 802 can be used to impart a phase shift $\varphi_{rep}$ of about 2π.

Figure 10B:
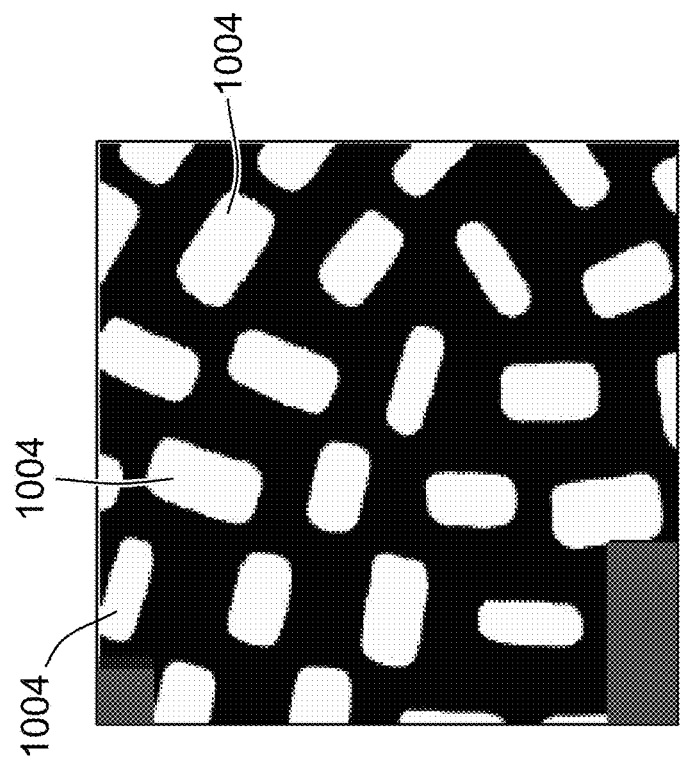
FIG. 10B is a zoomed-in view of the active layer of FIG. 10A, according to some aspects of the present disclosure.
Figure 10A:
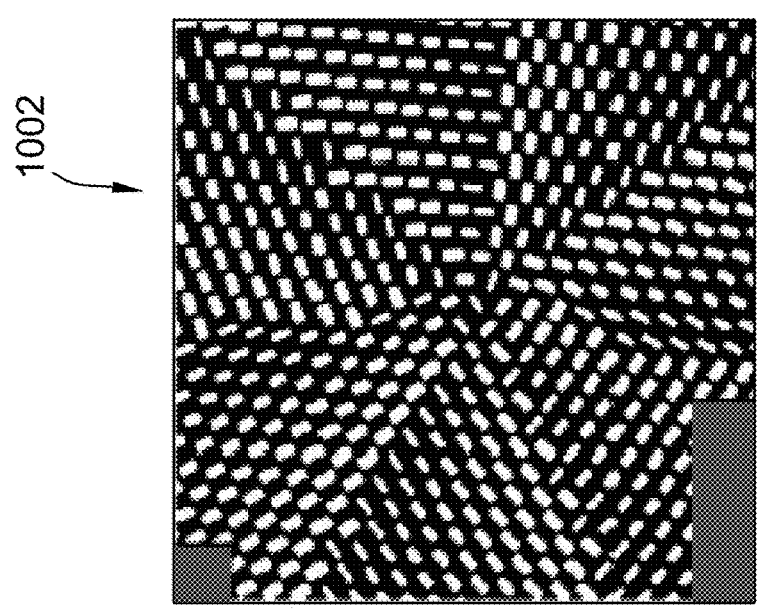
FIG. 10A is a front view of an active layer of an optical mask utilizing rectangular blocks, according to some aspects of the present disclosure.

Various other implementations of the structure of the functional layer can also be used to create an azimuthal phase gradient and aid in imparting orbital angular momentum on the incoming electromagnetic radiation. For example, FIG. 10A and FIG. 10B show an implementation of a functional layer 1002 that utilizes generally rectangular blocks 1004 to impart a phase shift. These blocks 1004 can be comprised of titanium dioxide ($TiO_2$) material and can be coupled to any suitable substrate, such as a quartz substrate. The long edges of the generally rectangular blocks 1004 can be between about 100 nanometers and about 250 nanometers, and can vary between individual blocks. The separation between adjacent rectangular 1004 blocks and their relative orientations can be selected to achieve the desired phase gradient.

At least two varieties of this implementation may be used: (i) metal-dielectric and (ii) fully dielectric. The metal-dielectric devices are fabricated according to a two-step lithographic process that involves the deposition of a subwavelength metal layer atop a transparent substrate. The lithographic definition of the chirped grating structures and selective metal etch is then performed. The formed metallic ring structures are then embedded in a transparent sub-wavelength dielectric that can be deposited for instance using a physical deposition method (e.g. magnetron sputtering) or a chemical deposition method (e.g. plasma-enhanced chemical vapor deposition). After planarization of the resulting structure a sub-wavelength semiconductor later is deposited atop and the desired morphology of nanowires obtained using lithographic pattern transfer and etching. For the fully dielectric structures, structure the process starts by depositing a sub-wavelength highly-transparent TiO2 layer atop a substrate (for example, transparent silica) and then uses conventional deep-UV lithography or electron beam lithography (in combination with selective etching) to transfer the desired aperiodic patterns on the substrate. Periodic, quasi-periodic and deterministic aperiodic patterns with chirping (spatially varying local spatial frequencies) can be fabricated using the same approach, as well different shapes of component structures. The height, shape and size of the blocks 1004 can be designed to produce a gradual azimuthal phase shift. As illustrated in FIG. 10A, the functional layer 1002 comprising these rectangular blocks can be divided into segments that each impart a respective phase shift, so as to implement an azimuthal phase gradient.

Figure 11B:
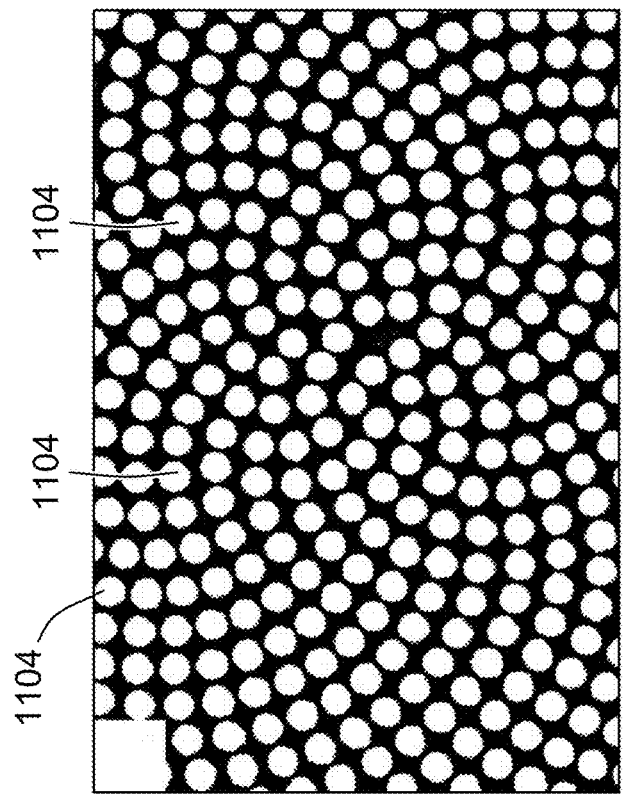
FIG. 11B is a zoomed-in view of the active layer of FIG. 11A, according to some aspects of the present disclosure.
Figure 11A:
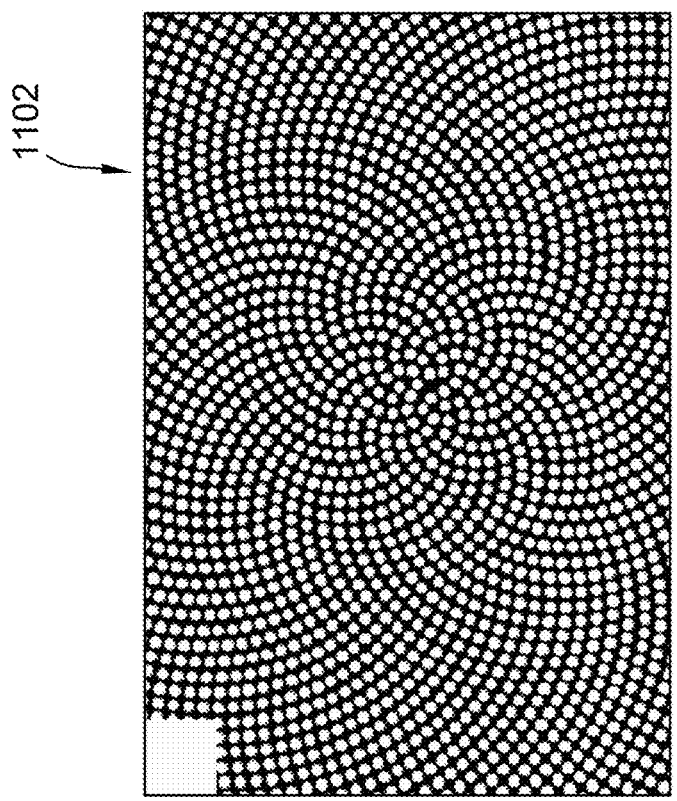
FIG. 11A is a front view of an active layer of an optical mask utilizing nano-disks in a spiral array, according to some aspects of the present disclosure.

The dimensions of the rectangular blocks 1004 vary depending on the specific spectral range of applications. For example, in order to achieve visible to near-infrared spectral separations, the height of the blocks 1004 can be between about 30 nanometers and about 500 nanometers, the width can be between about 50 nanometers and about 500 nanometers, and the separation between elements can be between about 100 nanometers and about 1000 nanometers when dielectric materials (non-metallic) are utilized. The spatial resolution on the imaging plane of the image sensor resulting from the implemented azimuthal phase gradient depends on the dimensions of the scattering elements, which are typically sub-wavelength (with respect to the wavelength of the incoming electromagnetic radiation). This guarantees high resolution in the spatial phase across the entire area of the functional layer. The size and shape variations of the blocks 1004 results in different phase shifts when light diffracts through them, with constant and almost unity transmission intensity when low-loss dielectric materials are used FIG. 11A and FIG. 11B illustrate another implementation of the functional layer of the optical mask. The functional layer 1102 in this implementation utilizes dielectric aperiodic structures known as Vogel spiral arrays. These spiral arrays can be comprised of nano-scale disks 1104 made of titanium dioxide (TiO$_2$) material on a substrate such as a quartz substrate. The spiral arrangement of the nano-scale disks 1104 can have an azimuthal modulation of spatial frequencies (e.g. distances between adjacent nano-scale disks 1104), which can impart orbital angular momentum on the incoming electromagnetic radiation. The height, shape and size of the nano-scale disks 1104 can be designed to produce an azimuthal phase gradient. The area of the functional layer 1102 using this implementation can be between about 100 microns by 100 microns, and about 1 millimeter by 1 millimeter.

Figure 12:
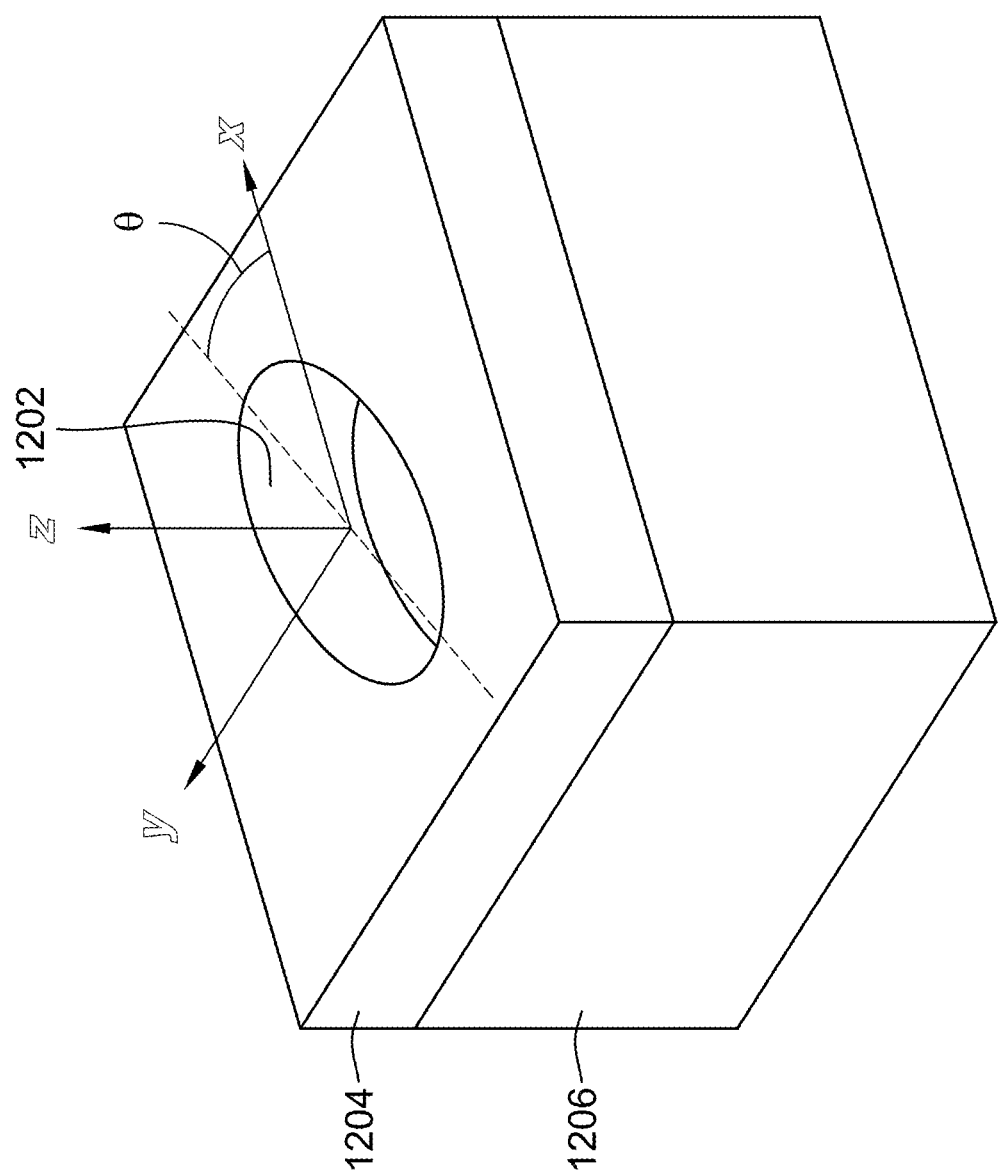
FIG. 12 is a perspective view of an active layer of an optical mask utilizing elliptical cavities defined in a gold thin film, according to some aspects of the present disclosure.

FIG. 12 illustrates an implementation of a functional layer of the optical mask that utilizes elliptical cavities 1202 defined in a gold thin film 1204 that has been deposited on a substrate 1206 such as quartz. In an example, when the peak wavelength of the incoming electromagnetic radiation is about 640 nanometers, the two axes of the elliptical cavities 1202 can be about 180 nanometers and about 90 nanometers. The thickness of the gold thin film 1204 can be about 100 nanometers.

Figure 13B:
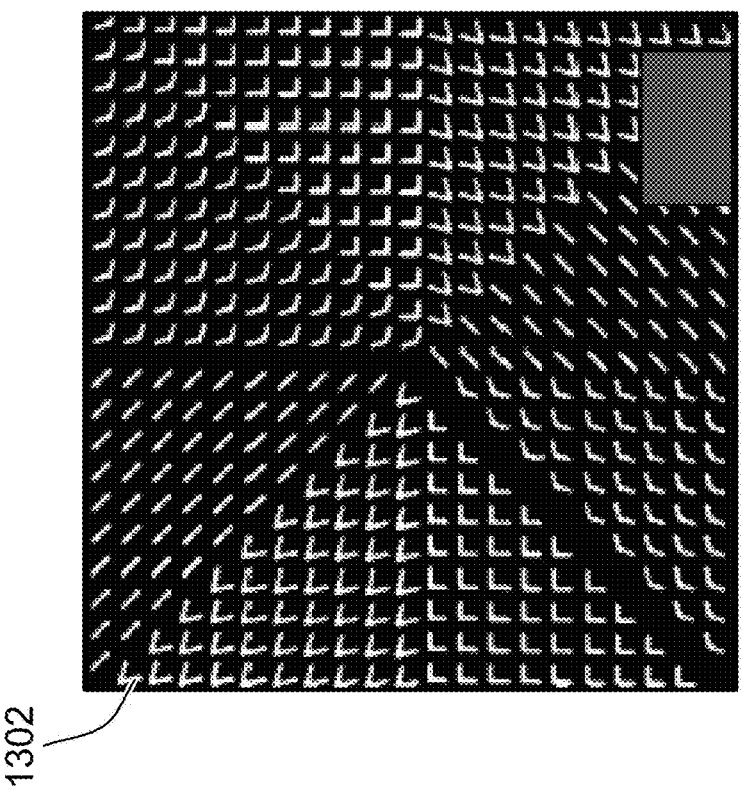
FIG. 13B is a front view of the active layer of FIG. 13A utilizing V-shaped elements to impart a phase shift, according to some aspects of the present disclosure.
Figure 13A:
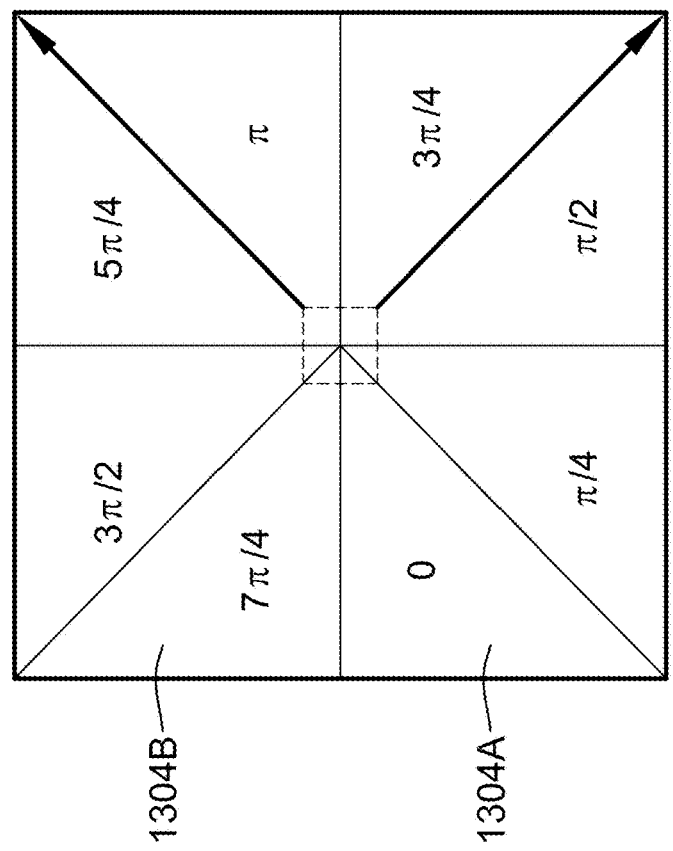
FIG. 13A is a representation of the surface of an active layer of an optical mask having eight segments imparting a phase shift, according to some aspects of the present disclosure.

FIG. 13A and FIG. 13B illustrate an implementation of a functional layer of the optical mask that utilizes V-shaped plasmonic subwavelength elements 1302 on a substrate. The plasmonic elements 1302 can be made of gold, while the substrate can be silicon. The height of each of the plasmonic elements 1302 can be about 50 nanometers, while the length of each arm of the "V" shape can be about 200 nanometers. As can be seen in FIG. 13A, the plasmonic elements can be arranged into segments that each impart a respective phase shift, so as to implement the azimuthal phase gradient. FIG. 13A shows a single $2\pi$ azimuthal phase gradient over the entire azimuthal dimension of the functional layer, starting at 0 with segment 1304A and advancing in increments of $\pi/4$ to segment 1304B, which imparts a phase shift of $$\frac{7\pi}{4}.$$

However, any number of segments with any amount of phase shift may be used, as discussed herein. The plasmonic elements 1302 of FIG. 13A and FIG. 13B can be more suitable for incoming electromagnetic radiation having wavelengths in the mid-infrared range up to the radio frequency range.

Figure 14:
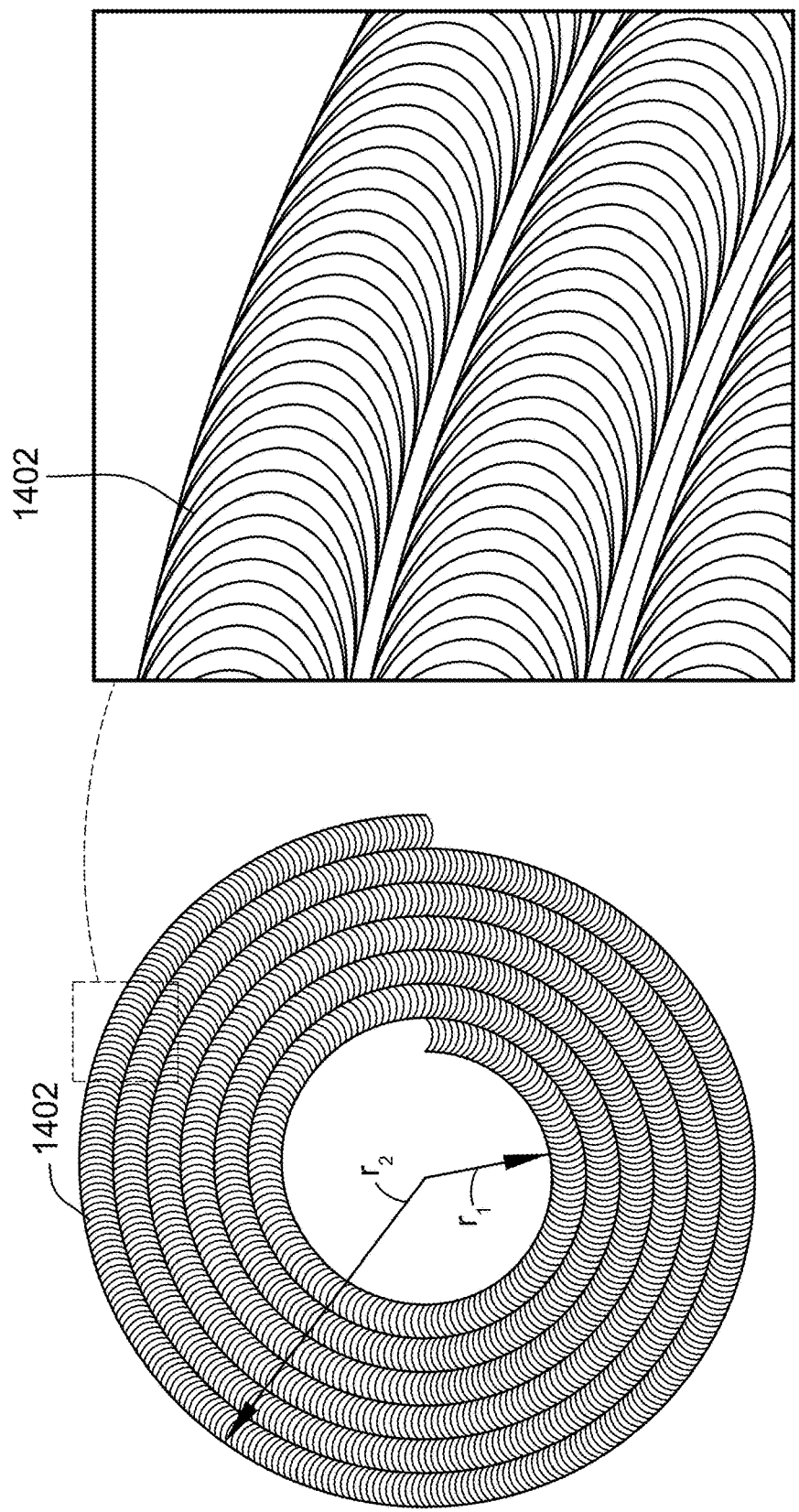
FIG. 14 is a perspective view of an active layer of an optical mask that utilizes crescent-shaped optical catenaries, according to some aspects of the present disclosure.

FIG. 14 illustrates an implementation of a functional layer of the optical mask that utilizes crescent-shaped optical catenaries 1402 to implement an azimuthal phase gradient. The optical catenaries 1402 can be made of gold, and can be deposited on any suitable substrate, such as silicon dioxide. For incoming electromagnetic radiation having a wavelength range between about 500 nanometers and about 800 nanometers, the thickness of the optical catenaries 1402 can be between about 10 nanometers and about 100 nanometers. The difference between inner radius $r_1$ and outer radius $r_2$ impacts the amount of phase shift that is imparted on the incoming electromagnetic radiation.

ALTERNATIVE IMPLEMENTATIONS

Alternative Implementation 1

An optical mask comprising: a substrate layer; an opaque layer; and a functional layer, wherein the functional layer in conjunction with the opaque layer is configured to impart orbital angular momentum and linear momentum on incoming electromagnetic radiation.

Alternative Implementation 2

The optical mask of Alternative Implementation 1, wherein the functional layer in conjunction with the opaque layer is configured to sort the incoming electromagnetic radiation according to frequency by the imparting of the orbital angular momentum and the linear momentum on the incoming electromagnetic radiation.

Alternative Implementation 3

The optical mask of Alternative Implementation 1, wherein the opaque layer includes a plurality of generally circular spatially chirped rings.

Alternative Implementation 4

The optical mask of Alternative Implementation 3, wherein the plurality of generally circular spatially chirped rings aids the optical mask in focusing the incoming electromagnetic radiation.

Alternative Implementation 5

The optical mask of Alternative Implementation 3, wherein the plurality of generally circular spatially chirped rings aids the optical mask in imparting the linear momentum on the incoming electromagnetic radiation.

Alternative Implementation 6

The optical mask of Alternative Implementation 1, wherein the functional layer includes an azimuthally modulated phase gradient.

Alternative Implementation 7

The optical mask of Alternative Implementation 6, wherein the azimuthally modulated phase gradient aids the optical mask in imparting the orbital angular momentum on the incoming electromagnetic radiation.

Alternative Implementation 8

The optical mask of Alternative Implementation 6, wherein the azimuthally modulated phase gradient includes at least three separate and distinct phase gradients such that a first portion of the incoming electromagnetic radiation is shifted a first phase amount, a second portion of the incoming electromagnetic radiation is shifted a second phase amount, and a third portion of the incoming electromagnetic radiation is shifted a third phase amount.

Alternative Implementation 9

The optical mask of Alternative Implementation 8, wherein each of the at least three separate and distinct phase gradients is repeated about an azimuthal dimension of the functional layer at least three times.

Alternative Implementation 10

The optical mask of Alternative Implementation 1, wherein the substrate is formed of a generally transparent material and the functional layer is formed of a generally transparent material.

Alternative Implementation 11

The optical mask of Alternative Implementation 1, wherein the optical mask is generally flat and has an area between about 50 square microns and 200 square microns.

Alternative Implementation 12

The optical mask of Alternative Implementation 11, wherein the functional layer has a thickness that is less than two microns.

Alternative Implementation 13

The optical mask of Alternative Implementation 1, wherein the functional layer includes a plurality of nanowires arranged to impart the orbital angular momentum on the incoming electromagnetic radiation.

Alternative Implementation 14

The optical mask of Alternative Implementation 13, wherein a first portion of the plurality of nanowires is arranged in parallel with one another and wherein a second portion of the plurality of nanowires is arranged in parallel with one another, the second portion of the plurality of nanowires being arranged at a non-zero angle relative to the first portion of the plurality of nanowires.

Alternative Implementation 15

The optical mask of Alternative Implementation 14, wherein the first portion of the plurality of nanowires imparts a first phase shift amount on a first portion of the incoming electromagnetic radiation and the second portion of the plurality of nanowires imparts a second phase shift amount on a second portion of the incoming electromagnetic radiation.

Alternative Implementation 16

The optical mask of Alternative Implementation 1 in combination with an image sensor having an imaging plane, wherein imaging plane is positioned between about 2 microns and about 50 microns from the substrate layer.

Alternative Implementation 17

The optical mask of Alternative Implementation 1 in combination with an image sensor having an imaging plane, wherein imaging plane is positioned in the Fresnel near field of the optical mask.

Alternative Implementation 18

The optical mask of Alternative Implementation 1 in combination with an image sensor having an imaging plane, wherein the imparted orbital angular momentum and linear momentum on the incoming electromagnetic radiation causes (i) a first portion of the incoming electromagnetic radiation to be incident on the imaging plane of the image sensor at a first set of coordinates and (ii) a second portion of the incoming electromagnetic radiation to be incident on the imaging plane of the image sensor at a second set of coordinates that is separate and distinct from the first set of coordinates.

Alternative Implementation 19

The combination of Alternative Implementation 18, wherein the image sensor is configured to generate image data associated with the first portion of the incoming electromagnetic radiation incident on the imaging plane at the first set of coordinates and the second portion of the incoming electromagnetic radiation incident on the imaging plane at the second set of coordinates.

Alternative Implementation 20

The combination of Alternative Implementation 19, further comprising one or more processors configured to (i) analyze the generated image data and (ii) based at least in part on the analyzed image data, identify the first portion of the incoming electromagnetic radiation and the second portion of the incoming electromagnetic radiation.

Alternative Implementation 21

The optical mask of Alternative Implementation 1, wherein the opaque layer is encapsulated within the substrate layer.

Alternative Implementation 22

The optical mask of Alternative Implementation 21, wherein the functional layer is coupled to the substrate.

Alternative Implementation 23

The optical mask of Alternative Implementation 1, further comprising a spacer layer, wherein the opaque layer is coupled to a first portion of the substrate layer, the spacer layer is coupled to the opaque layer and to a second portion of the substrate layer and the functional layer is coupled to the spacer layer.

Alternative Implementation 24

An optical mask comprising: a substrate layer having a first surface; and a functional layer coupled to the first surface of the substrate layer, the functional layer having a structure that is configured to impart orbital angular momentum and linear momentum on incoming electromagnetic radiation.

Alternative Implementation 25

The optical mask of Alternative Implementation 24, wherein the structure is configured to sort the incoming electromagnetic radiation according to frequency by the imparting of the orbital angular momentum and the linear momentum on the incoming electromagnetic radiation.

Alternative Implementation 26

The optical mask of Alternative Implementation 25, wherein the structure is configured to sort incoming electromagnetic radiation according to frequency at the same time.

Alternative Implementation 27

The optical mask of Alternative Implementation 25, wherein the incoming electromagnetic radiation includes radiation have wavelengths in a target spectral range between about 400 nanometers and about 700 nanometers.

Alternative Implementation 28

The optical mask of Alternative Implementation 24, wherein the structure of the functional layer includes a plurality of spatially chirped generally circular rings.

Alternative Implementation 29

The optical mask of Alternative Implementation 28, wherein the plurality of spatially chirped generally circular rings aids the optical mask in focusing the incoming electromagnetic radiation.

Alternative Implementation 30

The optical mask of Alternative Implementation 28, wherein the plurality of spatially chirped generally circular rings aids the optical mask in imparting the linear momentum on the incoming electromagnetic radiation.

Alternative Implementation 31

The optical mask of Alternative Implementation 28, wherein the plurality of spatially chirped generally circular rings are spatially chirped in one direction.

Alternative Implementation 32

The optical mask of Alternative Implementation 28, wherein the plurality of spatially chirped generally circular rings are chirped in two directions.

Alternative Implementation 33

The optical mask of Alternative Implementation 28, wherein the plurality of spatially chirped generally circular rings are linearly chirped.

Alternative Implementation 34

The optical mask of Alternative Implementation 28, wherein the plurality of spatially chirped generally circular rings are nonlinearly chirped.

Alternative Implementation 35

The optical mask of Alternative Implementation 24, wherein the structure of the functional layer includes an azimuthally modulated phase gradient.

Alternative Implementation 36

The optical mask of Alternative Implementation 35, wherein the azimuthally modulated phase gradient aids the optical mask in imparting the orbital angular momentum on the incoming electromagnetic radiation.

Alternative Implementation 37

The optical mask of Alternative Implementation 35, wherein the azimuthally modulated phase gradient aids the optical mask in imparting the orbital angular momentum and the linear momentum on the incoming electromagnetic radiation.

Alternative Implementation 38

The optical mask of Alternative Implementation 35, wherein the azimuthally modulated phase gradient includes at least three separate and distinct phase gradients such that a first portion of the incoming electromagnetic radiation is shifted a first phase amount, a second portion of the incoming electromagnetic radiation is shifted a second phase amount, and a third portion of the incoming electromagnetic radiation is shifted a third phase amount.

Alternative Implementation 39

The optical mask of Alternative Implementation 38, wherein the first phase amount is about $+\pi$ (pi) and the third phase amount is about $-\pi$ (pi).

Alternative Implementation 40

The optical mask of Alternative Implementation 39, wherein the second phase amount is between +π (pi) and −π (pi).

Alternative Implementation 41

The optical mask of Alternative Implementation 40, wherein the second phase amount is about zero.

Alternative Implementation 42

The optical mask of Alternative Implementation 38, wherein each of the at least three separate and distinct phase gradients is repeated about an azimuthal dimension of the functional layer at least three times.

Alternative Implementation 43

The optical mask of Alternative Implementation 42, wherein each of the at least three separate and distinct phase gradients is repeated about the azimuthal dimension of the functional layer in an alternating pattern.

Alternative Implementation 44

The optical mask of Alternative Implementation 38, wherein each of the at least three separate and distinct phase gradients is repeated about the azimuthal dimension of the functional layer at least five times.

Alternative Implementation 45

The optical mask of Alternative Implementation 24, wherein the substrate is formed of a first material and the functional layer is formed of a second material.

Alternative Implementation 46

The optical mask of Alternative Implementation 45, wherein the first material and the second material are different.

Alternative Implementation 47

The optical mask of Alternative Implementation 45, wherein the first material is at least partially transparent.

Alternative Implementation 48

The optical mask of Alternative Implementation 45, wherein the second material is at least partially transparent.

Alternative Implementation 49

The optical mask of Alternative Implementation 45, wherein the first material includes silicon nitride (SiN), Titanium dioxide (TiO2), silica (SiO2), silicon (Si), Germanium (Ge), gold (Au), silver (Ag), aluminum Al), copper (Cu), platinum (Pt), indium tin oxide (ITO), aluminum doped zinc oxide (AZO), nitrogen doped tin oxide (TiN), or any combination thereof.

Alternative Implementation 50

The optical mask of Alternative Implementation 45, wherein the second material includes silicon nitride (SiN), Titanium dioxide (TiO2), silica (SiO2), silicon (Si), Germanium (Ge), gold (Au), silver (Ag), aluminum Al), copper (Cu), platinum (Pt), indium tin oxide (ITO), aluminum doped zinc oxide (AZO), nitrogen doped tin oxide (TiN), or any combination thereof.

Alternative Implementation 51

The optical mask of Alternative Implementation 24, wherein the optical mask has an area between about 50 square microns and 200 square microns.

Alternative Implementation 52

The optical mask of Alternative Implementation 24, wherein the optical mask is generally flat.

Alternative Implementation 53

The optical mask of Alternative Implementation 24, wherein the optical mask has a thickness that is less than ten microns.

Alternative Implementation 54

The optical mask of Alternative Implementation 24, wherein the optical mask has a thickness that is less than five microns.

Alternative Implementation 55

The optical mask of Alternative Implementation 24, wherein the functional layer has a thickness that is less than two microns.

Alternative Implementation 56

The optical mask of Alternative Implementation 24, wherein the functional layer has a thickness that is less than one micron.

Alternative Implementation 57

The optical mask of Alternative Implementation 24, wherein the structure of the functional layer includes a plurality of nanowires arranged to impart the orbital angular momentum and the linear momentum on the incoming electromagnetic radiation.

Alternative Implementation 58

The optical mask of Alternative Implementation 57, wherein a first portion of the plurality of nanowires is arranged in parallel with one another and spaced from one another a distance.

Alternative Implementation 59

The optical mask of Alternative Implementation 58, wherein the distance is selected based on a target spectral range of the optical mask.

Alternative Implementation 60

The optical mask of Alternative Implementation 58, wherein the distance is about 150 nanometers.

Alternative Implementation 61

The optical mask of Alternative Implementation 58, wherein the distance is about 300 nanometers.

Alternative Implementation 62

The optical mask of Alternative Implementation 58, wherein a second portion of the plurality of nanowires is arranged in parallel with one another and spaced from one another the distance, the second portion of the plurality of nanowires being arranged at a non-zero angle relative to the first portion of the plurality of nanowires.

Alternative Implementation 63

The optical mask of Alternative Implementation 62, wherein the non-zero angle is between about ten degrees and about ninety degrees.

Alternative Implementation 64

The optical mask of Alternative Implementation 62, wherein the non-zero angle is about ninety degrees.

Alternative Implementation 65

The optical mask of Alternative Implementation 62, wherein the non-zero angle is about thirty degrees.

Alternative Implementation 66

The optical mask of Alternative Implementation 62, wherein the non-zero angle is about forty-five degrees.

Alternative Implementation 67

The optical mask of Alternative Implementation 62, wherein a third portion of the plurality of nanowires is arranged in parallel with one another and spaced from one another the distance, the third portion of the plurality of nanowires being arranged at a non-zero angle relative to the first portion of the plurality of nanowires and at a non-zero angle relative to the second portion of the plurality of nanowires.

Alternative Implementation 68

The optical mask of Alternative Implementation 67, wherein the first portion of the plurality of nanowires imparts a first phase shift amount on a first portion of the incoming electromagnetic radiation, the second portion of the plurality of nanowires imparts a second phase shift amount on a second portion of the incoming electromagnetic radiation, and the third portion of the plurality of nanowires imparts a third phase shift amount on a third portion of the incoming electromagnetic radiation.

Alternative Implementation 69

The optical mask of Alternative Implementation 68, wherein a total phase shift between the first phase shift amount and the second phase shift amount is about $2\pi$.

Alternative Implementation 70

The optical mask of Alternative Implementation 57, wherein each of the plurality of nanowires has a nanometer scale width and a nanometer scale height.

Alternative Implementation 71

The optical mask of Alternative Implementation 57, wherein each of the plurality of nanowires has a generally rectangular cross-section, a generally square cross-section, a generally circular cross-section, a generally polygonal cross-section, or any combination thereof.

Alternative Implementation 72

The optical mask of Alternative Implementation 57, wherein each of the plurality of nanowires has an aspect ratio that is greater than twenty.

Alternative Implementation 73

The optical mask of Alternative Implementation 57, wherein each of the plurality of nanowires has an aspect ratio that is greater than one hundred.

Alternative Implementation 74

The optical mask of Alternative Implementation 57, wherein each of the plurality of nanowires has an aspect ratio that is greater than one thousand.

Alternative Implementation 75

The optical mask of Alternative Implementation 24, wherein the structure of the functional layer includes a plurality of nanoparticles arranged to impart the orbital angular momentum and the linear momentum on the incoming electromagnetic radiation.

Alternative Implementation 76

An electromagnetic radiation sorting device comprising: an image sensor having an imaging plane; a substrate layer having a first surface and a second surface, the first surface of the substrate layer being positioned adjacent to and spaced a distance from the imaging plane of the image sensor; and a functional layer coupled to the second surface of the substrate layer, the functional layer having a structure that is configured to impart orbital angular momentum and linear momentum on incoming electromagnetic radiation.

Alternative Implementation 77

The electromagnetic radiation sorting device of Alternative Implementation 76, wherein the distance is between about 2 microns and about 50 microns.

Alternative Implementation 78

The electromagnetic radiation sorting device of Alternative Implementation 76, wherein the distance is selected such that the imaging plane of the image sensor is in the Fresnel near field.

Alternative Implementation 79

The electromagnetic radiation sorting device of Alternative Implementation 76, wherein the imaging plane is generally parallel with the first surface of the substrate layer.

Alternative Implementation 80

The electromagnetic radiation sorting device of Alternative Implementation 76, wherein the imaging plane has an area that is between about 50 square microns and about 200 square microns.

Alternative Implementation 81

The electromagnetic radiation sorting device of Alternative Implementation 76, wherein the image sensor includes at least one of a CCD (charge-coupled device) sensor, a CMOS (complementary metal-oxide-semiconductor) sensor, an NMOS (n-type metal-oxide-semiconductor) sensor, a photodiode array, a color filter array, and photomultiplier tube (PMT) array, or a line scan camera.

Alternative Implementation 82

The electromagnetic radiation sorting device of Alternative Implementation 76, wherein the imparted orbital angular momentum and linear momentum on the incoming electromagnetic radiation causes (i) a first portion of the incoming electromagnetic radiation to be incident on the imaging plane of the image sensor at a first set of coordinates and (ii) a second portion of the incoming electromagnetic radiation to be incident on the imaging plane of the image sensor at a second set of coordinates that is separate and distinct from the first set of coordinates.

Alternative Implementation 83

The electromagnetic radiation sorting device of Alternative Implementation 82, wherein the image sensor is configured to generate image data associated with the first portion of the incoming electromagnetic radiation incident on the imaging plane at the first set of coordinates and the second portion of the incoming electromagnetic radiation incident on the imaging plane at the second set of coordinates.

Alternative Implementation 84

The electromagnetic radiation sorting device of Alternative Implementation 83, further comprising one or more processors configured to (i) analyze the generated image data and (ii) based at least in part on the analyzed image data, identify the first portion of the incoming electromagnetic radiation and the second portion of the incoming electromagnetic radiation.

Alternative Implementation 85

An electromagnetic radiation sorting device comprising: an image sensor having an imaging plane; a substrate layer positioned adjacent to and spaced a distance from the imaging plane of the image sensor such that the imaging plane of the image sensor is in the Fresnel near field; and a functional layer coupled to the substrate layer, the functional layer having a structure that is configured to sort incoming electromagnetic radiation according to frequency by imparting orbital angular momentum and linear momentum on the incoming electromagnetic radiation.

Alternative Implementation 86

An electromagnetic radiation sorting device for sorting incoming electromagnetic radiation, the electromagnetic radiation sorting device comprising: a substrate layer formed of a first material, the substrate layer having a first generally planar surface and a second opposing generally planar surface, the substrate layer having an area between about 50 square microns and 200 square microns, the first material being at least partially transparent; an imaging sensor having an imaging plane that is positioned within the Fresnel near field, the imaging plane being generally parallel with the second opposing generally planar surface of the substrate, the imaging plane having an area that is about equal to the area of the substrate layer, the imaging sensor being configured to receive the incoming electromagnetic radiation on the imaging plane and to generate image data associated with the received electromagnetic radiation; a functional layer formed of a second material, the second material being at least partially transparent, the functional layer being coupled to the first generally planar surface of the substrate layer, the functional layer having a structure that is configured to impart orbital angular momentum and linear momentum on the incoming electromagnetic radiation such that a first portion of the incoming electromagnetic radiation is caused to be incident on the imaging plane of the imaging sensor at a first set of coordinates and a second portion of the incoming electromagnetic radiation is caused to be incident on the imaging plane of the imaging sensor at a second set of coordinates, the second set of coordinates being separate and distinct from the first set of coordinates; and one or more processors coupled to the imaging sensor and configured to (i) receive the generated image data from the imaging sensor, (ii) analyze the received image data and (iii) based at least in part on the analyzed image data, identify the first portion of the incoming electromagnetic radiation and the second portion of the incoming electromagnetic radiation.

Alternative Implementation 87

The electromagnetic sorting device of Alternative Implementation 86, wherein the imaging plane is positioned within the Fresnel near field such that the imaging plane is positioned adjacent to and spaced a distance of between about 2 microns and about 50 microns from the second opposing generally planar surface of the substrate layer.

Alternative Implementation 88

The electromagnetic sorting device of Alternative Implementation 86, wherein the first set of coordinates on the imaging plane is a function of a frequency of the first portion of the incoming electromagnetic radiation and the second set of coordinates on the imaging plane is a function of a frequency of the second portion of the incoming electromagnetic radiation.

Alternative Implementation 89

The electromagnetic sorting device of Alternative Implementation 86, wherein the first portion of the incoming electromagnetic radiation has a different wavelength than the second portion of the incoming electromagnetic radiation.

Alternative Implementation 90

The electromagnetic sorting device of Alternative Implementation 86, wherein the incoming electromagnetic radiation includes visible light, infrared light, ultraviolet light, microwaves, or any combination thereof.

Alternative Implementation 91

The electromagnetic sorting device of Alternative Implementation 86, wherein the first portion of the incoming electromagnetic radiation has a first band of wavelengths and the second portion of the incoming electromagnetic radiation has a second band of wavelengths that is different than the first band of wavelengths.

Alternative Implementation 92

The electromagnetic sorting device of Alternative Implementation 91, wherein the structure is configured to impart orbital angular momentum and linear momentum on the incoming electromagnetic radiation such that the first portion of the incoming electromagnetic radiation is caused to be incident on the imaging plane of the imaging sensor at the first set of coordinates at the same time that the second portion of the incoming electromagnetic radiation is caused to be incident on the imaging plane of the imaging sensor at the second set of coordinates.

Alternative Implementation 93

The electromagnetic sorting device of Alternative Implementation 91, wherein a third portion of the incoming electromagnetic radiation has a third band of wavelengths that is different than the first and second bands of wavelengths.

Alternative Implementation 94

The electromagnetic sorting device of Alternative Implementation 93, wherein the structure is configured to impart orbital angular momentum and linear momentum on the incoming electromagnetic radiation such that the third portion of the incoming electromagnetic radiation is caused to be incident on the imaging plane of the imaging sensor at a third set of coordinates, the third set of coordinates being separate and distinct from the first and second sets of coordinates.

Alternative Implementation 95

The electromagnetic sorting device of Alternative Implementation 86, wherein the substrate layer and the functional layer form an optical mask.

Alternative Implementation 96

The electromagnetic sorting device of Alternative Implementation 86, wherein the functional layer has a thickness that is less than one micron.

Alternative Implementation 97

The electromagnetic sorting device of Alternative Implementation 86, wherein the identification of the first portion of the incoming electromagnetic radiation includes determining a wavelength or band of wavelengths of the first portion of the incoming electromagnetic radiation and the identification of the second portion of the incoming electromagnetic radiation includes determining a wavelength or band of wavelengths of the second portion of the incoming electromagnetic radiation.

Alternative Implementation 98

The electromagnetic sorting device of Alternative Implementation 97, wherein a span of the determined band of wavelengths of the first portion of the incoming electromagnetic radiation is between about 1 nm wide and about 100 nm wide and wherein a span of the determined band of wavelengths of the second portion of the incoming electromagnetic radiation is between about 1 nm wide and about 100 nm wide.

Alternative Implementation 99

The electromagnetic sorting device of Alternative Implementation 97, wherein a span of the determined band of wavelengths of the first portion of the incoming electromagnetic radiation is between about 10 nm wide and about 30 nm wide and wherein a span of the determined band of wavelengths of the second portion of the incoming electromagnetic radiation is between about 10 nm wide and about 30 nm wide.

Alternative Implementation 100

The electromagnetic sorting device of Alternative Implementation 86, wherein the identification of the first portion of the incoming electromagnetic radiation includes determining a frequency or band of frequencies of the first portion of the incoming electromagnetic radiation and the identification of the second portion of the incoming electromagnetic radiation includes determining a frequency or band of frequencies of the second portion of the incoming electromagnetic radiation.

Alternative Implementation 101

An optical mask comprising: a substrate layer having a first surface; an opaque layer positioned within the substrate layer such that the opaque layer is encapsulated within the substrate layer; and a functional layer coupled to the first surface of the substrate layer, the functional layer in conjunction with the opaque layer having a structure that is configured to impart orbital angular momentum and linear momentum on incoming electromagnetic radiation.

Alternative Implementation 102

The optical mask of Alternative Implementation 101, wherein the opaque layer includes a plurality of generally circular spatially chirped rings.

Alternative Implementation 103

An optical mask comprising: a substrate layer having a first surface; an opaque layer having a first surface and an opposing second surface, the first surface of the opaque layer being coupled to a first portion the first surface of the substrate layer; a spacer layer having a first surface and an opposing second surface, the first surface of the spacer layer being coupled to a second portion of the first surface of the substrate layer; and a functional layer coupled to the spacer layer, the functional layer in conjunction with the opaque layer having a structure that is configured to impart orbital angular momentum and linear momentum on incoming electromagnetic radiation.

Alternative Implementation 104

The optical mask of Alternative Implementation 103, wherein the spacer layer is further coupled to the opposing second surface of the opaque layer such that the opaque layer is encapsulated between the substrate layer and the spacer layer.

Alternative Implementation 105

The optical mask of Alternative Implementation 103, wherein the opposing second surface of the opaque layer and the opposing second surface of the spacer layer are generally coplanar.

Alternative Implementation 106

The optical mask of Alternative Implementation 103, wherein the opaque layer includes a first plurality of generally circular spatially chirped rings.

Alternative Implementation 107

The optical mask of Alternative Implementation 106, wherein the spacer layer including a second plurality of generally circular spatially chirped rings, each of the second plurality of generally circular spatially chirped rings being positioned between an adjacent pair of the first plurality of generally circular spatially chirped rings such that the first and second pluralities of generally circular spatially chirped rings alternate in a radial direction.

Alternative Implementation 108

The optical mask of Alternative Implementation 107, wherein the functional layer includes a third plurality of generally circular spatially chirped rings.

Alternative Implementation 109

The optical mask of Alternative Implementation 108, wherein each of the third plurality of generally circular spatially chirped rings is coupled to a corresponding one of the second plurality of generally circular spatially chirped rings.

Alternative Implementation 110

An optical mask comprising: a substrate layer; an opaque layer; and a functional layer, wherein the functional layer in conjunction with the opaque layer form a predefined diffraction pattern that imparts orbital angular momentum and linear momentum on incoming electromagnetic radiation.

Alternative Implementation 111

The optical mask of Alternative Implementation 110, wherein the predefined diffraction pattern imparts the orbital angular momentum and linear momentum to sort the incoming electromagnetic radiation according to frequency.

Alternative Implementation 112

The optical mask of Alternative Implementation 110, wherein the predefined diffraction pattern includes a plurality of generally circular spatially chirped rings that aids the optical mask in focusing the incoming electromagnetic radiation.

Alternative Implementation 113

The optical mask of Alternative Implementation 110, wherein the predefined diffraction pattern includes an azimuthally modulated phase gradient that aids the optical mask in imparting the orbital angular momentum on the incoming electromagnetic radiation.

Alternative Implementation 114

The optical mask of Alternative Implementation 110, wherein the predefined diffraction pattern includes a plurality of nanowires, a first portion of the plurality of nanowires being arranged in parallel with one another and a second portion of the plurality of nanowires being arranged in parallel with one another, the second portion of the plurality of nanowires being arranged at a non-zero angle relative to the first portion of the plurality of nanowires such that the first portion of the plurality of nanowires imparts a first phase shift amount on a first portion of the incoming electromagnetic radiation and the second portion of the plurality of nanowires imparts a second phase shift amount on a second portion of the incoming electromagnetic radiation.

Alternative Implementation 115

The optical mask of Alternative Implementation 110 in combination with an image sensor having an imaging plane, the imaging plane being positioned between about 2 microns and about 50 microns from the substrate layer.

Alternative Implementation 116

The optical mask of Alternative Implementation 110 in combination with an image sensor having an imaging plane, wherein the imparted orbital angular momentum and linear momentum on the incoming electromagnetic radiation causes (i) a first portion of the incoming electromagnetic radiation to be incident on the imaging plane of the image sensor at a first set of coordinates and (ii) a second portion of the incoming electromagnetic radiation to be incident on the imaging plane of the image sensor at a second set of coordinates that is separate and distinct from the first set of coordinates.

Alternative Implementation 117

A method of manufacturing an optical mask for sorting incoming electromagnetic radiation, the method comprising: providing a substrate layer of optically transparent material; coupling an opaque layer to a first surface of the substrate layer; removing a portion of the opaque layer, thereby forming a plurality of generally circular spatially chirped rings in the opaque layer; coupling a spacer layer of optically transparent material to the substrate layer such that the plurality of generally circular spatially chirped rings is encapsulated between the substrate layer and the spacer layer; coupling a functional layer of optically transparent material to the spacer layer; and removing a portion of the functional layer, thereby forming a structure that in combination with the plurality of generally circular spatially chirped rings is configured to impart orbital angular momentum and linear momentum on incoming electromagnetic radiation.

Alternative Implementation 118

A method of manufacturing an optical mask for sorting incoming electromagnetic radiation, the method comprising: providing a substrate layer of optically transparent material; coupling a functional layer of optically transparent material to the spacer layer; and removing a portion of the functional layer, thereby forming a structure that is configured to impart orbital angular momentum and linear momentum on incoming electromagnetic radiation.

Alternative Implementation 119

The method of Alternative Implementation 118, wherein the structure includes a plurality of generally circular spatially chirped rings.

Alternative Implementation 120

The method of Alternative Implementation 118, wherein the structure includes an azimuthally modulated phase gradient.

Alternative Implementation 121

A method of sorting incoming electromagnetic radiation using an optical mask, the method comprising: providing an optical mask including a plurality of generally circular spatially chirped opaque rings and a transparent azimuthally modulated phase gradient; receiving incoming electromagnetic radiation on a first surface of the optical mask; imparting, using the optical mask, orbital angular momentum and linear momentum on incoming electromagnetic radiation such that a first portion of the incoming electromagnetic radiation is caused to be incident on an imaging plane of an image sensor at a first set of coordinates and a second portion of the incoming electromagnetic radiation is caused to be incident on the imaging plane of the image sensor at a second set of coordinates.

It is contemplated that any of the elements from any of the above-recited alternative implementations may be combined with one or more other elements from any of the above-recited alternative implementations and that such combinations are contemplated to fall within the scope of the present disclosure.

While the present disclosure has been described with reference to one or more particular embodiments or implementations, those skilled in the art will recognize that many changes may be made thereto without departing from the spirit and scope of the present disclosure. Each of these embodiments or implementations and obvious variations thereof is contemplated as falling within the spirit and scope of the present disclosure. It is also contemplated that additional embodiments implementations according to aspects of the present disclosure may combine any number of features from any of the embodiments described herein.

What is claimed is:

1. An optical mask comprising:
a substrate layer;
an opaque layer; and
a functional layer,
wherein the functional layer in conjunction with the opaque layer is configured to impart orbital angular momentum and linear momentum on incoming electromagnetic radiation.

2. The optical mask of claim 1, wherein the functional layer in conjunction with the opaque layer is configured to sort the incoming electromagnetic radiation according to frequency by the imparting of the orbital angular momentum and the linear momentum on the incoming electromagnetic radiation.

3. The optical mask of claim 1, wherein the opaque layer includes a plurality of generally circular spatially chirped rings.

4. The optical mask of claim 3, wherein the plurality of generally circular spatially chirped rings aids the optical mask in focusing the incoming electromagnetic radiation.

5. The optical mask of claim 3, wherein the plurality of generally circular spatially chirped rings aids the optical mask in imparting the linear momentum on the incoming electromagnetic radiation.

6. The optical mask of claim 1, wherein the functional layer includes an azimuthally modulated phase gradient.

7. The optical mask of claim 6, wherein the azimuthally modulated phase gradient aids the optical mask in imparting the orbital angular momentum on the incoming electromagnetic radiation.

8. The optical mask of claim 6, wherein the azimuthally modulated phase gradient includes at least three separate and distinct phase gradients such that a first portion of the incoming electromagnetic radiation is shifted a first phase amount, a second portion of the incoming electromagnetic radiation is shifted a second phase amount, and a third portion of the incoming electromagnetic radiation is shifted a third phase amount.

9. The optical mask of claim 8, wherein each of the at least three separate and distinct phase gradients is repeated about an azimuthal dimension of the functional layer at least three times.

10. The optical mask of claim 1, wherein the substrate is formed of a generally transparent material and the functional layer is formed of a generally transparent material.

11. The optical mask of claim 1, wherein the optical mask is generally flat and has an area between about 50 square microns and 200 square microns.

12. The optical mask of claim 11, wherein the functional layer has a thickness that is less than two microns.

13. The optical mask of claim 1, wherein the functional layer includes a plurality of nanowires arranged to impart the orbital angular momentum on the incoming electromagnetic radiation.

14. The optical mask of claim 13, wherein a first portion of the plurality of nanowires is arranged in parallel with one another and wherein a second portion of the plurality of nanowires is arranged in parallel with one another, the second portion of the plurality of nanowires being arranged at a non-zero angle relative to the first portion of the plurality of nanowires.

15. The optical mask of claim 14, wherein the first portion of the plurality of nanowires imparts a first phase shift amount on a first portion of the incoming electromagnetic radiation and the second portion of the plurality of nanowires imparts a second phase shift amount on a second portion of the incoming electromagnetic radiation.

16. The optical mask of claim 1 in combination with an image sensor having an imaging plane, wherein imaging plane is positioned between about 2 microns and about 50 microns from the substrate layer.

17. The optical mask of claim 1 in combination with an image sensor having an imaging plane, wherein imaging plane is positioned in the Fresnel near field of the optical mask.

18. The optical mask of claim 1 in combination with an image sensor having an imaging plane, wherein the imparted orbital angular momentum and linear momentum on the incoming electromagnetic radiation causes (i) a first portion of the incoming electromagnetic radiation to be incident on the imaging plane of the image sensor at a first set of coordinates and (ii) a second portion of the incoming electromagnetic radiation to be incident on the imaging plane of the image sensor at a second set of coordinates that is separate and distinct from the first set of coordinates.

19. The combination of claim 18, wherein the image sensor is configured to generate image data associated with the first portion of the incoming electromagnetic radiation incident on the imaging plane at the first set of coordinates and the second portion of the incoming electromagnetic radiation incident on the imaging plane at the second set of coordinates.

20. The combination of claim 19, further comprising one or more processors configured to (i) analyze the generated image data and (ii) based at least in part on the analyzed image data, identify the first portion of the incoming electromagnetic radiation and the second portion of the incoming electromagnetic radiation.

21. The optical mask of claim 1, wherein the opaque layer is encapsulated within the substrate layer.

22. The optical mask of claim 21, wherein the functional layer is coupled to the substrate.

23. The optical mask of claim 1, further comprising a spacer layer, wherein the opaque layer is coupled to a first portion of the substrate layer, the spacer layer is coupled to the opaque layer and to a second portion of the substrate layer and the functional layer is coupled to the spacer layer.

24. An optical mask comprising:
a substrate layer;
an opaque layer; and
a functional layer,
wherein the functional layer in conjunction with the opaque layer form a predefined diffraction pattern that imparts orbital angular momentum and linear momentum on incoming electromagnetic radiation.

25. The optical mask of claim 24, wherein the predefined diffraction pattern imparts the orbital angular momentum and linear momentum to sort the incoming electromagnetic radiation according to frequency.

26. The optical mask of claim 24, wherein the predefined diffraction pattern includes a plurality of generally circular spatially chirped rings that aids the optical mask in focusing the incoming electromagnetic radiation.

27. The optical mask of claim 24, wherein the predefined diffraction pattern includes an azimuthally modulated phase gradient that aids the optical mask in imparting the orbital angular momentum on the incoming electromagnetic radiation.

28. The optical mask of claim 24, wherein the predefined diffraction pattern includes a plurality of nanowires, a first portion of the plurality of nanowires being arranged in parallel with one another and a second portion of the plurality of nanowires being arranged in parallel with one another, the second portion of the plurality of nanowires being arranged at a non-zero angle relative to the first portion of the plurality of nanowires such that the first portion of the plurality of nanowires imparts a first phase shift amount on a first portion of the incoming electromagnetic radiation and the second portion of the plurality of nanowires imparts a second phase shift amount on a second portion of the incoming electromagnetic radiation.

29. The optical mask of claim 24 in combination with an image sensor having an imaging plane, the imaging plane being positioned between about 2 microns and about 50 microns from the substrate layer.

30. The optical mask of claim 24 in combination with an image sensor having an imaging plane, wherein the imparted orbital angular momentum and linear momentum on the incoming electromagnetic radiation causes (i) a first portion of the incoming electromagnetic radiation to be incident on the imaging plane of the image sensor at a first set of coordinates and (ii) a second portion of the incoming electromagnetic radiation to be incident on the imaging plane of the image sensor at a second set of coordinates that is separate and distinct from the first set of coordinates.

* * * * *